United States Patent
He et al.

(10) Patent No.: US 10,582,518 B2
(45) Date of Patent: Mar. 3, 2020

(54) WIRELESS COMMUNICATION METHOD AND SYSTEM, AND DEVICE

(71) Applicant: HUAWEI TECHNOLOGIES CO., LTD., Shenzhen, Guangdong (CN)

(72) Inventors: Chuanfeng He, Shenzhen (CN); Bingyu Qu, Beijing (CN)

(73) Assignee: HUAWEI TECHNOLOGIES CO., LTD., Shenzhen, Guangdong (NA)

( * ) Notice: Subject to any disclaimer, the term of this patent is extended or adjusted under 35 U.S.C. 154(b) by 0 days.

(21) Appl. No.: 16/023,390

(22) Filed: Jun. 29, 2018

(65) Prior Publication Data

US 2018/0310323 A1    Oct. 25, 2018

Related U.S. Application Data

(63) Continuation of application No. PCT/CN2015/100316, filed on Dec. 31, 2015.

(51) Int. Cl.
*H04W 72/10* (2009.01)
*H04W 72/04* (2009.01)

(52) U.S. Cl.
CPC .......... *H04W 72/10* (2013.01); *H04W 72/04* (2013.01); *H04W 72/046* (2013.01)

(58) Field of Classification Search
CPC .... H04W 72/10; H04W 72/046; H04W 72/04
USPC ...................................... 455/562.1
See application file for complete search history.

(56) References Cited

U.S. PATENT DOCUMENTS

| | | | | |
|---|---|---|---|---|
| 2004/0214606 | A1* | 10/2004 | Wichman | H04B 7/0408 455/562.1 |
| 2010/0026575 | A1 | 2/2010 | Maruhashi et al. | |
| 2011/0110453 | A1 | 5/2011 | Prasad et al. | |
| 2012/0213196 | A1 | 8/2012 | Chung et al. | |
| 2014/0286246 | A1 | 9/2014 | Bao et al. | |

(Continued)

FOREIGN PATENT DOCUMENTS

| | | |
|---|---|---|
| CN | 103327630 A | 9/2013 |
| CN | 103354478 A | 10/2013 |

(Continued)

OTHER PUBLICATIONS

XP051001375 R1-153945 CATT,"CSI feedback for beamformed CSI-RS on PUCCH",3GPP TSG RAN WG1 Meeting #82,Beijing, China, Aug. 24-28, 2015,total 4 pages.

*Primary Examiner* — Inder P Mehra
(74) *Attorney, Agent, or Firm* — Womble Bond Dickinson (US) LLP

(57) ABSTRACT

A wireless communication method and system, and a device: A first network device determines m first signals, a first spatial resource corresponding to each first signal, and a resource set to which each first spatial resource belongs, and sends a first signal on each corresponding first spatial resource; a second network device determines a response signal according to at least one received first signal, a first spatial resource corresponding to a first signal, and a resource set to which each first spatial resource belongs, and sends the response signal to the first network device; and the first network device sends a second signal to the second network device on k second spatial resources according to the received response signal. The embodiments of the present invention are used for wireless communication.

17 Claims, 16 Drawing Sheets

(56) References Cited

U.S. PATENT DOCUMENTS

| | | |
|---|---|---|
| 2015/0003250 A1 | 1/2015 | Bouley et al. |
| 2015/0282122 A1 | 10/2015 | Kim et al. |
| 2016/0197659 A1 | 7/2016 | Yu et al. |
| 2016/0345216 A1 | 11/2016 | Kishiyama et al. |
| 2017/0265184 A1* | 9/2017 | Liu .................. H04B 7/04 |

FOREIGN PATENT DOCUMENTS

| | | |
|---|---|---|
| EP | 2897305 A1 | 7/2015 |
| JP | 2015-164281 A | 9/2015 |
| WO | 2008/090836 A1 | 7/2008 |
| WO | 2015020404 A1 | 2/2015 |
| WO | 2015/110211 A1 | 7/2015 |

* cited by examiner

WIRELESS COMMUNICATION METHOD AND SYSTEM, AND DEVICE

CROSS-REFERENCE TO RELATED APPLICATIONS

This application is a continuation of International Application No. PCT/CN2015/100316, filed on Dec. 31, 2015, the disclosure of which is hereby incorporated by reference in its entirety.

TECHNICAL FIELD

The present invention relates to the field of communications technologies, and in particular, to a wireless communication method and system, and a device.

BACKGROUND

In a high-frequency scenario, due to an increase in path loss, a massive multiple-input multiple-output (Massive MIMO) beamforming (Beam Forming) technology needs to be used to form very high antenna gains to compensate the path loss. There are many massive MIMO antennas, and even hundreds of antennas. When a large antenna gain is formed, a formed beam has a greater spatial coverage length, but has a smaller spatial coverage width. For example, in FIG. 1, a formed beam can cover only user equipment (UE) 1, and UE2 cannot be covered by the beam. Therefore, one beam cannot cover all user equipments in a cell. To cover all the user equipments in the cell and meet a preset coverage requirement, a plurality of narrow beams need to be used to cover the cell, to meet communications requirements of all the user equipments in the cell.

To meet service requirements of user equipments covered by narrow beams, in the prior art, a wireless signal is usually sent to the user equipment using each narrow beam, thereby resulting in an increase in system resource overheads. For example, refer to a narrow beam coverage status of a cell 1 shown in FIG. 2. There are only two user equipments UE1 and UE2 in the cell 1 currently. When the UE1 and the UE2 access a wireless network, access signals such as synchronization information and system information need to be sent using each narrow beam of a beam 0 to a beam 7 shown in FIG. 2. It can be learned from FIG. 2 that the beam 7 does not cover the UE1 or the UE2, and an access signal sent by the beam 7 is not used by the user equipments to access the wireless network. However, system resources are also occupied for sending the access signal using the beam 7, thereby increasing the system resource overheads.

SUMMARY

Embodiments of the present invention provide a communication method, device, and system, so as to resolve a problem of large system overheads caused in the prior art in which each beam is used to send a wireless signal to serve user equipment in a narrow beam coverage scenario.

To achieve the foregoing objective, the embodiments of the present invention use the following technical solutions:

According to a first aspect, a wireless communication method is provided. A first network device sends m first signals using first spatial resources in different resource sets, where each first signal includes corresponding identification information, and the corresponding identification information is used to indicate a first spatial resource corresponding to a first signal and is further used to indicate a resource set to which the first spatial resource belongs. A second network device selects at least one first spatial resource according to at least one received first signal, a first spatial resource corresponding to a first signal, and a resource set to which each first spatial resource belongs, and indicates the selected first spatial resource to the first network device using a response signal. The first network device learns of, according to the response signal, the existing of the second network device, and a correspondence between the second wireless network and the indicated first spatial resource, and therefore determines k second spatial resources that can meet a preset coverage requirement, and sends a second signal on the k second spatial resources, where k is a relatively small value.

Therefore, the second signal can be sent more efficiently, thereby saving second spatial resources, and saving system resource overheads required for sending the second signal on an invalid second spatial resource. In addition, interference may be further avoided when the second signal is sent on an invalid second spatial resource other than the k second spatial resources.

In one embodiment, m first spatial resources that are corresponding to the m first signals and that are determined by the first network device belong to different resource sets.

When the first spatial resources used by the first network device for sending the first signals belong to different resource sets, first spatial resources indicated in the response signal sent by the second network device may also belong to different resource sets. Because spatial coverage areas of first spatial resources in different resource sets are not the same, first spatial resources with different coverage areas can meet coverage requirements of different quantities of second network devices. Therefore, the first network device may determine, according to correspondences between the second network devices and the first spatial resources indicated in the sent response signals and according to coverage areas of the first spatial resources that belong to different resource sets, a combination of a relatively small quantity of second spatial resources that can meet the preset coverage requirement, and send the second signal by using the determined second spatial resources, thereby reducing a quantity of second spatial resources that serve the second network devices, and reducing system resource overheads.

In one embodiment, first spatial resources that are in the m first spatial resources and that belong to a same resource set are corresponding to coverage of one area, and the area is in a same cell.

Therefore, second network devices in the same cell may be synchronized in a timely manner.

In one embodiment, an amount of information contained in the first signal is less than an amount of information contained in the second signal.

The second signal that contains a relatively large amount of information is sent by using a relatively small quantity of second spatial resources, whereas the first signal that contains a relatively small amount of information is sent by using a relatively large quantity of first spatial resources. This may reduce power overheads and energy overheads of the first network device, thereby reducing the system resource overheads.

In one embodiment, the corresponding identification information includes set identification information that is used to indicate the resource set to which the first spatial resource belongs, and the set identification information is:
a set identification character included in the first signal;
a type of a sequence included in the first signal;

a type of a scrambling code added for information in the first signal;

a type of a mask added for information in the first signal; or a calculation manner of a cyclic redundancy check code CRC of information in the first signal.

In one embodiment, the second network device determines, among the at least one received first signal, a first signal that meets a preset condition.

In one embodiment, the first signal that meets the preset condition is a first signal with signal strength greater than or equal to a threshold, where the threshold is a threshold corresponding to a resource set to which a first spatial resource corresponding to the first signal belongs.

In this way, when signal strength of a first signal received by the second network device is greater than or equal to a preset threshold, it may indicate that the signal of the first signal is relatively strong, and that a first spatial resource corresponding to the first signal can meet the coverage requirement of the second network device.

In one embodiment, a set of first signals that meet a first preset condition includes first signals, among the first signals received by the second network device, that are corresponding to first spatial resources agreed between the second network device and the first network device.

In one embodiment, the second network device selects, according to priorities corresponding to resource sets or priorities corresponding to first spatial resources, at least one first spatial resource among first spatial resources corresponding to first signals that meet the preset condition, and adds identification information of the selected first spatial resource to the response signal.

In one embodiment, the first network device determines, among n first spatial resources indicated by the response signal, s first spatial resources according to priorities corresponding to resource sets to which the first spatial resources belong or priorities corresponding to the first spatial resources, where s is a positive integer, determines the k second spatial resources that are corresponding to the s first spatial resources, and sends the second signal to the second network device on the k second spatial resources.

In one embodiment, a resource set to which a first spatial resource with a greater coverage width belongs is corresponding to a smaller threshold, and a resource set with a smaller threshold is corresponding to a higher priority.

In this way, the second network device may preferably send first spatial resources with a greater coverage width in different resource sets to the first network device. The first spatial resources with a greater coverage width may meet coverage requirements of more second network devices, so that the first network device may more easily determine, according to the first spatial resources with a greater coverage width, a relatively small quantity of second spatial resources that can meet the preset coverage requirement, thereby reducing the system resource overheads.

In one embodiment, if there is a large quantity of second network devices that indicate the first spatial resource by using the response signal, the first spatial resource has a high priority.

Because first spatial resources indicated by a plurality of second network devices can meet coverage requirements of the plurality of second network devices, the first network device may preferably select a first spatial device that can meet the coverage requirements of the plurality of second network devices, thereby reducing a quantity of the s first spatial resources that can meet the preset coverage requirement, further reducing a quantity of the corresponding second spatial resources, k, and reducing the system resource overheads.

In one embodiment, the priorities corresponding to the resource sets and the priorities corresponding to the first spatial resources are pre-negotiated between the first network device and the second network device.

According to a second aspect, a network device is provided, including a processor, a memory, and a transceiver. The memory is configured to store an instruction. The processor is configured to execute the instruction stored in the memory, to control the transceiver to perform signal reception and transmission. When the processor executes the instruction stored in the memory, the network device is configured to perform an action corresponding to the first network device in the method according to any one of the first aspect and all possible implementations of the first aspect.

According to a third aspect, a network device is provided, including a processor, a memory, and a transceiver. The memory is configured to store an instruction. The processor is configured to execute the instruction stored in the memory, to control the transceiver to perform signal reception and transmission. When the processor executes the instruction stored in the memory, the network device is configured to perform an action corresponding to the second network device in the method according to any one of the first aspect and all possible implementations of the first aspect.

According to a fourth aspect, a wireless communications system is provided, including the network device described in the second aspect and the network device described in the third aspect.

For ease of understanding, the following uses examples to describe some concepts related to the present invention for reference.

The 3rd Generation Partnership Project (3GPP) is a project devoted to developing a wireless communications network. Generally, a 3GPP related institution is referred to as a 3GPP institution.

A wireless communications network is a network that provides a wireless communications function. The wireless communications network may use different communications technologies, for example, Code Division Multiple Access (CDMA), Wideband Code Division Multiple Access (WCDMA), Time Division Multiple Access (TDMA), Frequency Division Multiple Access (FDMA), orthogonal frequency division multiple access (OFDMA), single carrier frequency division multiple access (SC-FDMA), or carrier sense multiple access with collision avoidance. According to factors such as capacities, rates, and delays of different networks, networks may be classified into 2G (Generation) networks, 3G networks, or 4G networks. A typical 2G network includes a Global system for mobile communications (GSM) network or a general packet radio service (GPRS) network. A typical 3G network includes a Universal Mobile Telecommunications System (UMTS) network. A typical 4G network includes a Long Term Evolution (LTE) network. The UMTS network may sometimes be referred to as a universal terrestrial radio access network (UTRAN). The LTE network may sometimes be referred to as an evolved universal terrestrial radio access network (E-UTRAN). According to different resource allocation manners, networks may be classified into cellular communications networks and wireless local area networks (WLAN). The cellular communications networks are scheduling-dominated, and the WLANs are competition-dominated. All the foregoing 2G 3G and 4G networks are the cellular communications networks. Persons skilled in the art should learn that with the development of technologies, the technical solutions provided in the embodiments of the present invention may also be applied to another wireless communications network, for example, a 4.5G or a 5G network, or another non-cellular communications network. For brevity, the wireless communications network may sometimes be simply referred to as a network in the embodiments of the present invention.

FDMA is a frequency division multiplexing multi-carrier transmission manner. Multiplexed signals (subcarriers) are orthogonal.

A cellular communications network is one of wireless communications networks. The cellular communications network connects a terminal device and a wireless network device by using a wireless channel in a cellular wireless networking manner, so that users can communicate with each other when being in activities. A main feature of the cellular communications network is terminal mobility. The cellular communications network supports functions of performing a handover across cells and automatic roaming across local area networks.

User equipment (UE) is a terminal device. The user equipment may be a mobile terminal device, or may be a non-mobile terminal device. The equipment is mainly configured to receive or send service data. User equipments may be distributed in a network. The user equipments have different names in different networks, for example, a terminal, a mobile station, a user unit, a station, a cellular phone, a wireless modem, a wireless communications device, Session Initiation Protocol (SIP) phone, a smart phone, a wireless local loop (WLL) station, a personal digital assistant (PDA), a laptop computer, a handheld communications device, and a satellite wireless device. The user equipment may communicate with one or more core networks by using a radio access network (RAN) (e.g., an access part of the wireless communications network). The user equipment may be configured to communicate with one or more user equipments (for example, D2D communication), or may be configured to communicate with one or more base stations. The user equipment may also be referred to as a user terminal, and may include some or all of functions of a system, a user unit, a user station, a mobile station, a mobile wireless terminal, a mobile device, a node, a device, a remote station, a remote terminal, a terminal, a wireless communications device, a wireless communications apparatus, or a user agent.

A base station (BS) device may also be referred to as a base station, and is an apparatus deployed on a radio access network to provide a wireless communications function. For example, devices that provide a base station function in a 2G network include a base wireless transceiver station (BTS) and a base station controller (BSC), devices that provide a base station function in a 3G network include a node B (NodeB) and a radio network controller (RNC), a device that provides a base station function in a 4G network includes an evolved node B (English: Evolved NodeB, eNB for short), and a device that provides a base station function in a WLAN is an access point (AP). The base station may be configured to communicate with one or more user equipments, or may be configured to communicate with one or more base stations with some user equipment functions (for example, communication between a macro base station and a micro base station or communication between access points). The base station may communicate with a wireless terminal by using an air interface. The communication may be implemented by using one or more sectors. The base station may also convert a received air interface frame into an IP packet, to serve as a router between a wireless terminal and another part of an access network, where the access network includes an Internet Protocol (IP) network. In addition, the base station may coordinate management of an air interface attribute, and may also be a gateway between a wired network and a wireless network.

A wireless network device is a device located in a wireless communications network. The device may be a base station, user equipment, or the like.

A frame structure, a radio frame, a subframe, a symbol, and a timeslot are described as follows:

The frame structure is a structure showing division of a time resource (a time domain) used to transmit a signal. In wireless communication, commonly-used time units in the frame structure are a radio frame, a subframe, and a timeslot in descending order. Specifically, a time length corresponding to each time unit may be set according to a specific protocol requirement. A frame structure in LTE is used as an example. A radio frame has a length of 10 ms and includes 10 subframes. Each subframe has a length of 1 ms and further includes two timeslots. Each timeslot (Slot) is 0.5 ms. The symbol (Symbol) is a minimum unit of a signal. An LTE network is used as an example. Each OFDM subcarrier is corresponding to an OFDM symbol. When a guard interval between symbols is not considered, a length (an occupied time) of an OFDM symbol is 1/an interval between subcarriers. When a guard interval between symbols is considered, a time occupied by an OFDM symbol is a sum of a length of the OFDM symbol and a length of a cyclic prefix (CP).

In an OFDM system, in order to eliminate intersymbol interference to a maximum extent, a guard interval needs to be inserted between each OFDM symbol. A length Tg of the guard interval should be generally greater than a maximum delay spread of a radio channel. In this way, a multipath component of a symbol does not interfere with a next symbol.

Within the guard interval, no signal may be inserted. That is, the guard interval is an idle transmission time segment. However, in this case, due to multipath propagation, interchannel interference is generated. That is, orthogonality between subcarriers is damaged, and as a result, interference is generated between different subcarriers. To eliminate the interchannel interference caused by the multipath propagation, periodic extension is performed for the OFDM symbol with an original width of T, and an extension signal is used to fill the guard interval.

A frame number is a number of each radio frame. An LTE network is used as an example. Frames in LTE are numbered from 0 to 1023 and then re-numbered from 0.

Resources include a time resource, a frequency resource, a code resource, and a spatial resource.

The time resource is a resource that is occupied by a signal and measured by time. For example, a signal occupies two OFDM symbols, or one subframe, or three radio frames in time. The time resource may include an absolute time resource and a relative time resource, for example, at least one of a radio frame number, a relative position of a subframe in a radio frame, or a relative position of a symbol in a subframe. A common description that a time resource is fixed or variable is for the relative time resource. However, a common description that time resources are the same may mean that absolute time resources are the same, or may mean that relative time resources are the same.

The frequency resource is a resource that is occupied by a signal and measured by frequency. For example, a signal occupies 10 MHz in frequency. In an OFDM system, a subcarrier quantity is generally used to describe an occupied frequency resource.

A time-frequency resource is a resource that is occupied by a signal and measured by time and frequency. For example, a signal occupies two OFDM symbols in time and occupies 10 MHz in frequency.

The code resource is a resource that is occupied by a signal and measured by code, for example, a spreading code in WCDMA. A sequence resource used by a signal is also referred to as the code resource, for example, a sequence used by a synchronization signal.

A sequence is one of code resources.

The spatial resource is a resource that is occupied by a signal and measured by beam. For multiple-input multiple-output (MIMO) transmission, signals may be transmitted in parallel on a same time-frequency resource by using beams that point to different directions.

Access is a process of establishing an initial connection between wireless network devices. Specific types of the wireless network devices may not be limited. Access is commonly performed between UE and a base station, and between a micro base station and a macro base station. In the embodiments of the present invention, access is also applied between UEs.

A synchronization signal is a signal used by a receiver to implement at least one of frequency synchronization or time synchronization with a sender.

A cell-specific reference signal (CRS) carries information related to channel precoding, assists UE in performing downlink channel estimation, and may also be used for channel quality detection.

A channel state information-reference signal (CSI-RS) is used to measure information such as a channel quality indicator, a precoding indicator, or a rank when a reference signal is located.

A physical broadcast channel (PBCH) carries a broadcast channel and uses QPSK modulation. A duration of a transport block is 40 ms.

System information, that is, system information broadcast, and mainly provides main information of a to-be-accessed network for establishing a wireless connection with UE, so that the UE obtains enough access information and public configuration parameters of cell selection and reselection. System information in LTE is divided into a plurality of system information blocks (SIB). One of the system information blocks is called a master information block (MIB). The MIB is also referred to as a broadcast signal. Other SIBs are referred to as the system information. LTE system information broadcasting and 3G system information broadcasting are the same in function, but there is still a big difference in scheduling and specific information content. The MIB usually includes a limited quantity of most important and most commonly used transmission parameters, whereas the other SIBs usually include a cell radio configuration, cell reselection information, a neighboring cell list, a home eNB identifier (Home eNB Identifier), notification information such as an earthquake and tsunami warning system (ETWS) or a commercial mobile alert system (CMAS), and a parameter such as multimedia multicast (MBMS) control information.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
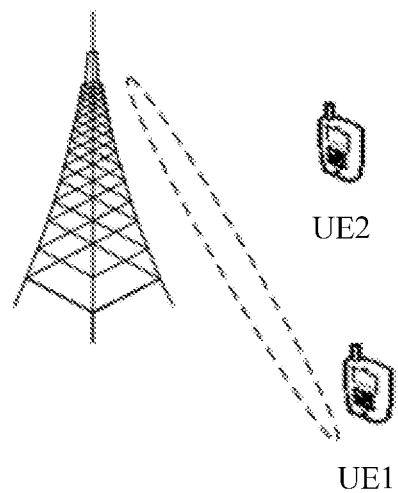
FIG. 1 is a schematic diagram of one type of beam coverage according to an embodiment of the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Terms such as "component", "module", and "system" used in this application are used to indicate computer-related entities. The computer-related entities may be hardware, firmware, combinations of hardware and software, software, or software in running. For example, a component may be, but is not limited to, a process that runs on a processor, a processor, an object, an executable file, a thread of execution, a program, and/or a computer. In an example, both a computing device and an application that runs on the computing device may be components. One or more components may reside within a process and/or a thread of execution, and a component may be located on one computer and/or distributed between two or more computers. In addition, these components may be executed from various computer-readable media that have various data structures. These components may communicate by using a local and/or remote process and according to, for example, a signal having one or more data packets (for example, data from one component, where the component interacts with another component in a local system or a distributed system, and/or interacts with other systems via a network such as the Internet by using a signal).

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

The word "example" in the embodiments of the present invention is used to represent giving an example, an illustration, or a description. Any embodiment or design scheme described as an "example" in this application should not be explained as being more preferred or having more advantages than another embodiment or design scheme. Exactly, "for example" is used to present a concept in a specific manner.

In the embodiments of the present invention, one of information, signal, message, or channel may be used sometimes. It should be noted that expressed meanings are consistent when differences are not emphasized. One of "of (of)", "corresponding (Corresponding, Relevant)", or "corresponding (Corresponding)" may be used sometimes. It should be noted that expressed meanings are consistent when differences are not emphasized.

A network architecture and a service scenario described in the embodiments of the present invention are intended to describe the technical solutions in the embodiments of the present invention more clearly, and do not constitute any limitation on the technical solutions provided in the embodiments of the present invention. Persons of ordinary skill in the art may understand that with the evolution of network architectures and the emergence of a new service scenario, the technical solutions provided in the embodiments of the present invention are also applicable to a similar technical problem.

The embodiments of the present invention may be applied not only to a time division duplex (TDD) scenario but also to a frequency division duplex (FDD) scenario.

The embodiments of the present invention are described based on a scenario of an LTE network in wireless communications networks. It should be noted that the solutions in the embodiments of the present invention may also be applied to another wireless communications network. A corresponding name may also be replaced with a name of a corresponding function in another wireless communications network.

The LTE network uses an OFDM technology. The OFDM technology converts a high-speed data stream into a plurality of parallel low-speed data streams by means of serial/parallel conversion, and then allocates the low-speed data streams to subchannels on several subcarriers of different frequencies for transmission. The OFDM technology utilizes subcarriers that are orthogonal to each other. Because each subcarrier is corresponding to a symbol, spectra of the subcarriers overlap, thereby greatly improving spectrum utilization. In an OFDM system, subcarrier spacing $\Delta f$ is a frequency difference between two adjacent subcarriers in the OFDM system. A bandwidth of the OFDM system is equal to the subcarrier spacing multiplied by a theoretical maximum quantity of subcarriers of the system. The theoretical maximum quantity of subcarriers of the system is a maximum quantity of subcarriers when a frequency guard bandwidth is not considered. However, as a matter of fact, the OFDM system usually reserves about 10% of the guard bandwidth. Therefore, a quantity of subcarriers actually configured for the system is less than the maximum quantity of subcarriers.

Methods or devices in the embodiments of the present invention may be applied between a base station and user equipment in a narrow beam coverage scenario, or may be applied between base stations (for example, between a macro base station and a micro base station), or may be applied between user equipments (for example, in a D2D scenario). This is not limited herein.

In the narrow beam coverage scenario, to meet communication requirements of the user equipment, in the prior art, a wireless signal is usually sent by using each beam to serve the user equipment, thereby resulting in a problem of large system resource overheads.

To address the foregoing problem in the prior art that exists when wireless communication is performed in the narrow beam coverage scenario, the embodiments of the present invention provide a communication method and system, and a device. Main principles are as follows: A first network device sends m first signals by using first spatial resources in different resource sets, where each first signal includes corresponding identification information, and the corresponding identification information is used to indicate a first spatial resource corresponding to a first signal and is further used to indicate a resource set to which a first spatial resource belongs. A second network device selects at least one first spatial resource according to at least one received first signal, a first spatial resource corresponding to a first signal, and a resource set to which each first spatial resource belongs, and indicates the selected first spatial resource to the first network device by using a response signal. The first network device learns of the existing of the second network device and a correspondence between the second wireless network and the indicated first spatial resource according to the response signal, and therefore determines k second spatial resources that can meet a preset coverage requirement, and sends a second signal on the k second spatial resources, where k is a relatively small value. In this way, the first network device serves the second network device by using the k second spatial resources. Therefore, the second signal can be sent more efficiently, thereby saving second spatial resources, and saving system resource overheads required for sending the second signal on an invalid second spatial resource.

The first signal and the second signal may be various types of wireless signals interacted in a wireless communication process. In the embodiments of the present invention, information types of the first signal and the second signal are not limited. For example, the first signal may be a synchronization signal, a measurement signal such as a CRS or a CSI-RS, a PBCH broadcast signal, or the like, and the second signal may be system information, a synchronization signal, a reference signal, a data signal, or the like.

The foregoing preset coverage requirement may be set according to an actual requirement. For example, meeting the preset coverage requirement may be meeting coverage requirements of all second network devices, or meeting coverage requirements of 95% of second network devices. When signal strength of a second signal received by the second network device by using a second spatial resource is greater than or equal to a preset value, it indicates that a coverage requirement of the second network device is met.

When the first spatial resources used by the first network device for sending the first signals belong to different resource sets, first spatial resources indicated in the response signal sent by the second network device may also belong to different resource sets. Because spatial coverage areas of first spatial resources in different resource sets are not the same, first spatial resources with different coverage areas can meet coverage requirements of different quantities of second network devices. Therefore, the first network device may determine, according to correspondences between the second network devices and the first spatial resources indicated in the sent response signals and according to coverage areas of the first spatial resources that belong to different resource sets, a combination of a relatively small quantity of second spatial resources that can meet the preset coverage requirement, and send the second signal by using the determined second spatial resources, thereby reducing a quantity of second spatial resources that serve the second network devices, and reducing system resource overheads.

In addition, when sending the first signal and the second signal, the first network device occupies certain spatial resources, time resources, frequency resources, and code resources. When a quantity of spatial resources serving the second network devices decreases, time resources, frequency resources, and code resources that serve the second network devices decrease accordingly, thereby further reducing the system resource overheads.

The following provides a detailed description by using a specific embodiment.

Figure 3:
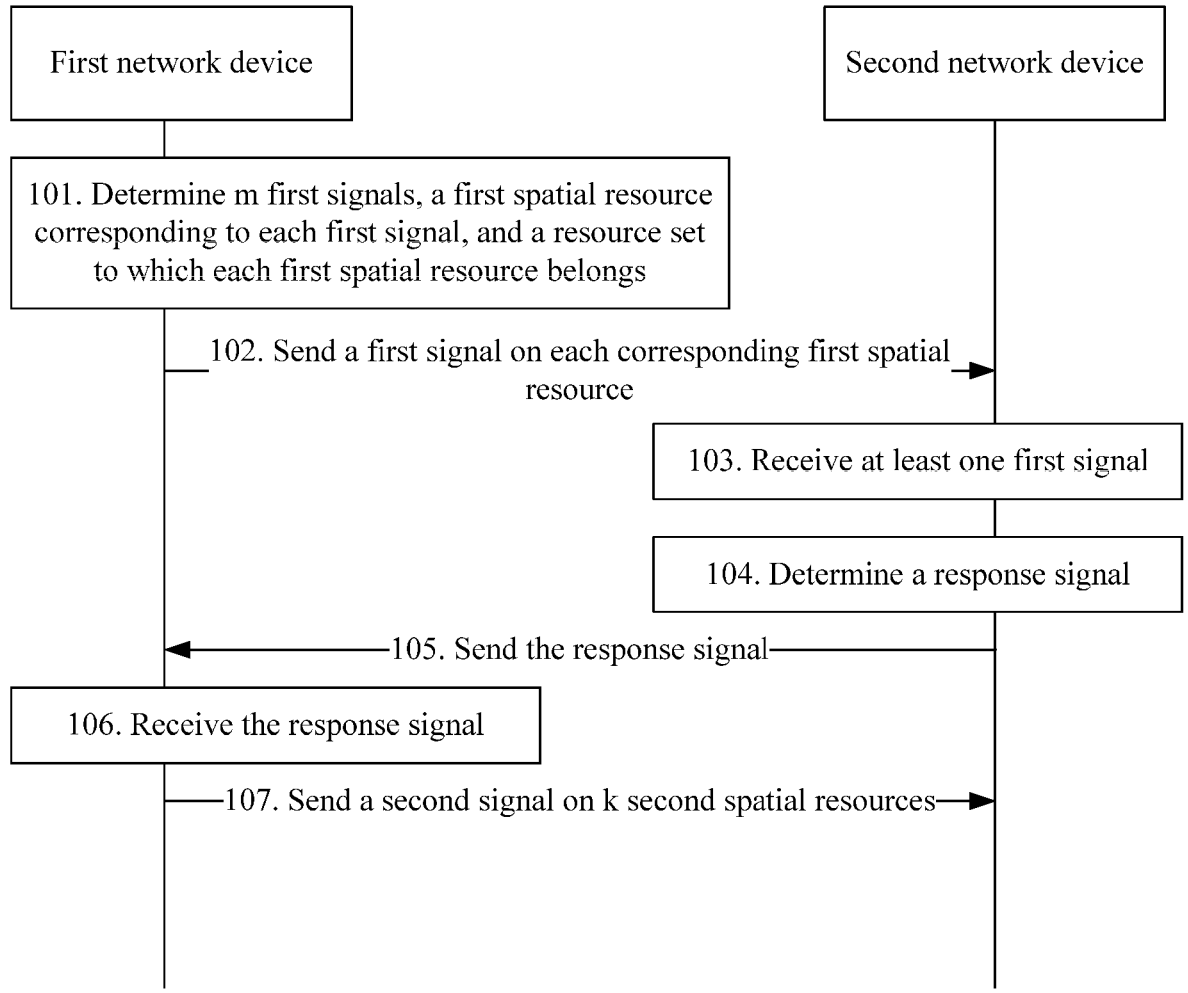
FIG. 3 is a flowchart of a wireless communication method according to an embodiment of the present invention.

Referring to FIG. 3, an embodiment of the present invention provides a wireless communication method, which may include the following operations.

Operation 101. A first network device determines m first signals, a first spatial resource corresponding to each first signal, and a resource set to which each first spatial resource belongs, where m is a positive integer.

In this operation, the first network device may determine the m first signals, m first spatial resources sending the m first signals, and resource sets to which the m first spatial resources belong, where m may be a positive integer greater than 1. The spatial resource herein has a same meaning as a beam. Each beam has a certain spatial coverage area, including a coverage width and a coverage length. The resource set herein has a same meaning as a beam set.

The m first spatial resources may belong to different resource sets. Beams in different resource sets do not have an exactly same coverage length or an exactly same coverage width. Different first spatial resources in a same resource set have a roughly same coverage length and a roughly same coverage width.

Figure 4A:
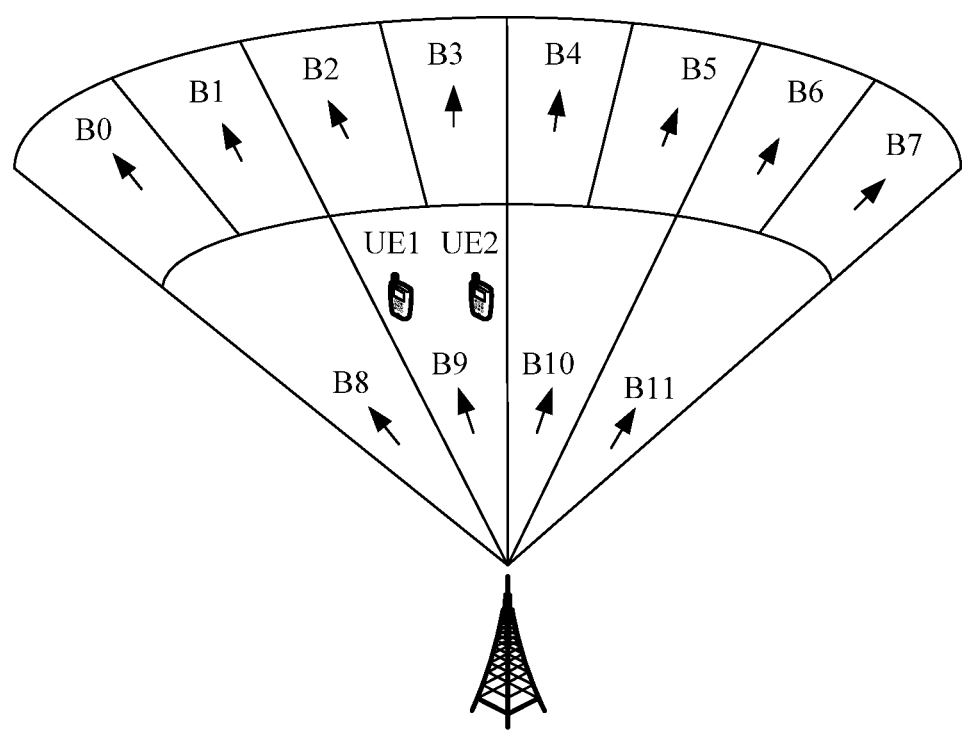
FIG. 4a is a schematic diagram of another type of beam coverage according to an embodiment of the present invention.

For example, the first network device may send the first signals by using 12 beams in two resource sets shown in FIG. 4a. The 12 beams may have the same cell identifier, or be controlled by a same radio resource control layer. In addition, beams in each resource set may be corresponding to coverage of an area of a cell 1. A beam 0 to a beam 7 may belong to a resource set 1 and cover the cell 1. A beam 8 to a beam 11 may belong to a resource set 2 and cover the cell 1.

Figure 4B:
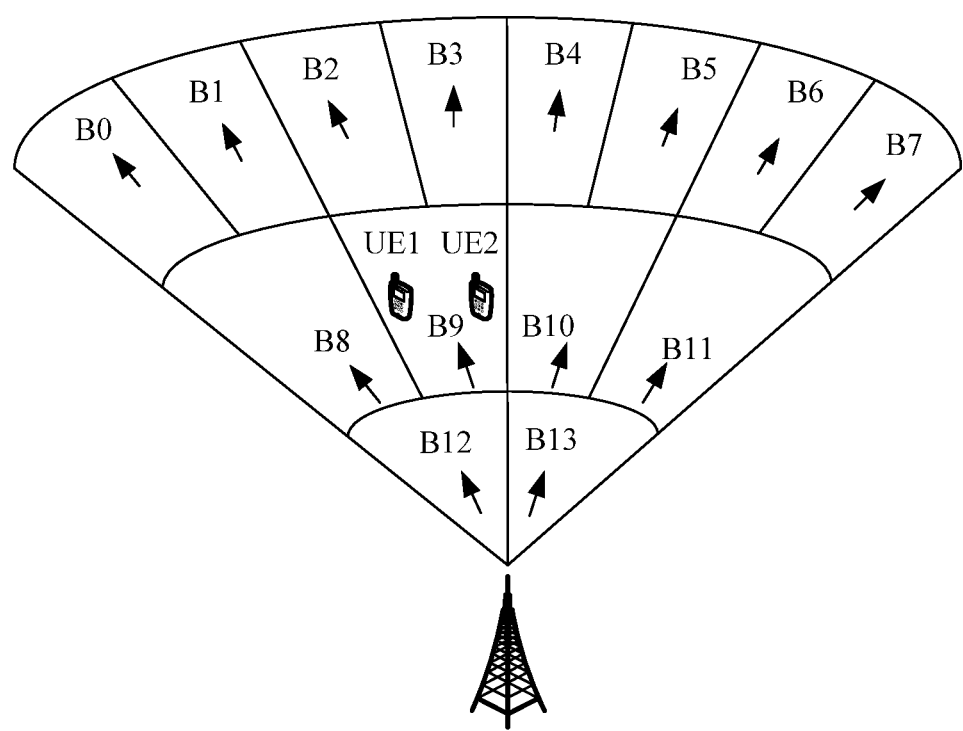
FIG. 4b is a schematic diagram of another type of beam coverage according to an embodiment of the present invention.

For another example, the first network device may send the first signals by using 14 beams in three resource sets shown in FIG. 4b. The 14 beams may have a same cell identifier, or be controlled by a same radio resource control layer. A beam 0 to a beam 7 may belong to a resource set 1, a beam 8 to a beam 11 may belong to a resource set 2, and a beam 12 and a beam 13 may belong to a resource set 3. The beam 12 and the beam 13 may also cover the cell 1.

Figure 2:
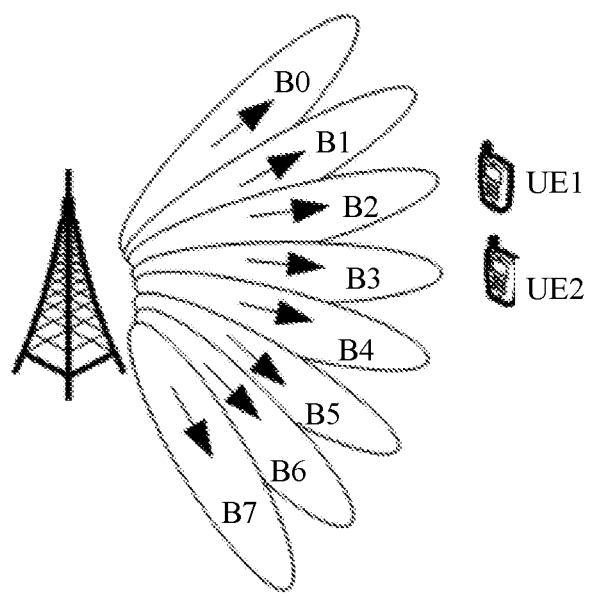
FIG. 2 is a schematic diagram of another type of beam coverage according to an embodiment of the present invention.

The beams 0 to the beams 7 shown in FIG. 4a and FIG. 4b are the same as a beam 0 to a beam 7 in a narrow beam set shown in FIG. 2.

It can be learned from FIG. 4a that, compared with beams in the resource set 2, the beams in the resource set 1 have smaller coverage widths and greater coverage lengths; and compared with the beams in the resource set 1, the beams in the resource set 2 have greater coverage widths and smaller coverage lengths. It can be learned from FIG. 4b that when beams in the resource set 1, beams in the resource set 2, and beams in the resource set 3 are compared, the beams in the resource set 1 have smallest coverage widths and greatest coverage lengths, the beams in the resource set 3 have greatest coverage widths and smallest coverage lengths, and the beams in the resource set 2 have medium coverage widths and also medium coverage lengths. Actually, because energy emitted by an antenna is limited, coverage widths and coverage lengths of formed beams are usually inversely proportional.

It should be noted that this embodiment of the present invention does not make any limitations on a specific quantity of first spatial resources used for sending the first signals and a specific quantity of resource sets to which the first spatial resources belong. A quantity of resource sets to which the m first spatial resources belong is greater than or equal to 2.

In this embodiment of the present invention, a description is provided using an example in which the first spatial resources used for sending the first signals are the 12 beams in the two resource sets shown in FIG. 4a, a base station shown in FIG. 4a is the first network device, and user equipment UE1 and user equipment UE2 shown in FIG. 4a are the second network devices.

Operation 102. The first network device sends a first signal on each corresponding first spatial resource, where each first signal includes corresponding identification information, the corresponding identification information is used to indicate a first spatial resource corresponding to a first signal, and the corresponding identification information is further used to indicate a resource set to which a first spatial resource belongs.

The first network device sends one first signal on each first spatial resource shown in FIG. 4a. A first spatial resource on which a first signal is sent is a first spatial resource corresponding to the first signal. In addition, time resources, frequency resources, and code resources that are used for sending the first signals may be set according to an actual requirement of a system. This is not limited herein.

Each first signal includes the corresponding identification information. The corresponding identification information may be used to indicate a first spatial resource corresponding to a first signal, and a resource set to which a first spatial resource belongs.

The corresponding identification information may include resource identification information that is used to indicate a first spatial resource corresponding to a first signal. As shown in FIG. 2, in the prior art, a wireless signal is usually sent on each beam of the beam 0 to the beam 7 that are corresponding to a beam set 1, and the wireless signal usually includes beam identification information that is used to identify a beam. Therefore, in this embodiment of the present invention, an identification manner existing in the prior art, for example, a beam number, may be used for the resource identification information in the identification information. Details are not described herein.

The corresponding identification information may further include set identification information that is used to indicate the resource set to which the first spatial resource belongs. The set identification information may be:

a set identification character included in the first signal;

a type of a sequence included in the first signal;

a type of a scrambling code added for information in the first signal;

a type of a mask added for information in the first signal; or a calculation manner of a cyclic redundancy check code CRC of information in the first signal.

For example, the first signal includes a synchronization signal. The synchronization signal includes a primary synchronization signal PSS and/or a secondary synchronization signal SSS. The set identification information is a type of a sequence in the PSS and/or the SSS. The primary synchronization signal PSS in the synchronization signal may use a sequence 1-8 to identify, as a resource set 1, a resource set to which a first spatial resource corresponding to a first signal belongs, and use a sequence 9-12 to identify, as a resource set 2, a resource set to which a first spatial resource corresponding to a first signal belongs. In addition, when the synchronization signal further includes the SSS, different sequence types may be used in the PSS and/or the SSS to identify different resource sets.

For example, the first signal includes PBCH-carried information, and the set identification information is a resource set identification character in the PBCH-carried information. Currently, the PBCH-carried information includes 14-bit indication information. The indication information is mainly used to indicate a downlink system bandwidth, a system frame number, physical hybrid automatic repeat indicator channel (PHICH) configuration, and the like. Besides the 14-bit indication information, the PBCH-carried information further includes 10 idle bits. In this embodiment of the present invention, the first network device may use the 10 idle bits to carry the set identification character, and use the set identification character as the set identification information to identify a resource set to which a first spatial resource corresponding to a first signal belongs. For example, in the PBCH-carried information, a $15^{th}$ bit is used to carry the set identification character. When the character in the $15^{th}$ bit is 0, it may represent that a resource set to which a first spatial resource corresponding to a first signal belongs is a resource set 1. When the character in the $15^{th}$ bit is 1, it may represent that a resource set to which a first spatial resource corresponding to a first signal belongs is a resource set 2.

For example, the first signal includes PBCH-carried information, and the set identification information is a type of a scrambling code added for the PBCH-carried information. For example, a scrambling code 1 added for the PBCH-carried information in the first signal may be used to identify, as a resource set 1, a resource set to which a first spatial resource corresponding to a first signal belongs, and a scrambling code 2 added for the PBCH-carried information in the first signal may be used to identify, as a resource set 2, a resource set to which a first spatial resource corresponding to a first signal belongs.

For example, the first signal includes a CSR or a CSI-RS, and the set identification information is a type of a scrambling code added for the CSR or the CSI-RS.

For example, the first signal includes PBCH-carried information, and the set identification information is a type of a mask added for a cyclic redundancy check code (CRC) of the PBCH-carried information. For example, a mask 1 added for the CRC of the PBCH-carried information in the first signal may be used to identify, as a resource set 1, a resource set to which a first spatial resource corresponding to a first signal belongs, and a mask 2 added for the CRC of the PBCH-carried information in the first signal may be used to identify, as a resource set 2, a resource set to which a first spatial resource corresponding to a first signal belongs.

For example, the first signal includes PBCH-carried information, and the set identification information is a calculation manner of a CRC of the PBCH-carried information. For example, a calculation manner 1 used by the CRC of the PBCH-carried information in the first signal may be used to identify, as a first beam set, a first spatial resource set in which a first signal is located, and a calculation manner 2 used by the CRC of the PBCH-carried information in the first signal may be used to identify, as a second beam set, a first spatial resource set in which a first signal is located.

It should be noted that the foregoing descriptions of the set identification information in the first signal are merely examples, and the set identification information may also be in another form. Examples are not described herein one by one.

Operation 103. A second network device receives at least one first signal.

The second network device receives the at least one first signal sent by the first network device. Each first signal includes corresponding identification information. The corresponding identification information is used to indicate a first spatial resource corresponding to a first signal, and the corresponding identification information is further used to indicate a resource set to which a first spatial resource belongs. First signals that the second network device receives on different first spatial resources have different signal strength.

Operation 104. The second network device determines a response signal according to the at least one first signal, a first spatial resource corresponding to a first signal, and a resource set to which each first spatial resource belongs, where the response signal is used to indicate at least one selected first spatial resource.

After receiving the at least one first signal, the second network device may select, according to the at least one first signal, the first spatial resource corresponding to the first signal, and the resource set to which each first spatial resource belongs, at least one first spatial resource corresponding to the second network device, and indicate the selected first spatial resource to the first network device by using the response signal.

Operation 105. The second network device sends the response signal to the first network device.

Operation 106. The first network device receives the response signal sent by the second network device, where the response signal is used to indicate n first spatial resources, and n is a positive integer.

The first network device receives a response signal sent by each second network device, and obtains n first spatial resources indicated in the response signal, where n is a positive integer.

Operation 107. The first network device sends a second signal to the second network device on k second spatial resources according to the response signal, where k is a positive integer.

After receiving the response signal, the first network device may learn of, according to the response signal, the second network device existing in the cell 1, and correspondences between the second wireless network and the indicated first spatial resources, and therefore determine k second spatial resources that can meet a preset coverage requirement, where k is a relatively small value. In this way, the first network device serves the second network device by using the k second spatial resources. Therefore, the second signal can be sent more efficiently, thereby saving second spatial resources, and saving system resource overheads required for sending the second signal on an invalid second spatial resource. In addition, interference may be further avoided when the second signal is sent on an invalid second spatial resource other than the k second spatial resources.

It should be noted that when the first spatial resources used by the first network device for sending the first signals belong to different resource sets, the first spatial resources indicated in the response signal sent by the second network device may also belong to different resource sets. Because spatial coverage areas of first spatial resources in different resource sets are not the same, first spatial resources with different coverage areas can meet coverage requirements of different quantities of second network devices. Therefore, the first network device may determine, according to correspondences between the second network devices and the first spatial resources indicated in the sent response signals and according to coverage areas of the first spatial resources that belong to different resource sets, a relatively small quantity of second spatial resources that can meet the preset coverage requirement, and send the second signal by using the determined second spatial resources, thereby reducing a quantity of second spatial resources that serve the second network devices, and reducing system resource overheads.

In addition, when a quantity of spatial resources serving user equipment decreases, time resources, frequency resources, and code resources that serve the user equipment decrease accordingly, thereby further reducing system overheads.

In the foregoing process, the first signal may be a signal that contains a relatively small amount of information, and the second signal may be a signal that contains a relatively large amount of information. The second signal is sent on a relatively small quantity of second spatial resources determined by the first network device. Therefore, when the second signal that contains the relatively large amount of information is sent by using the relatively small quantity of second spatial resources, and the first signal that contains the relatively small amount of information is sent by using a relatively large quantity of first spatial resources, power overheads and energy overheads of the first network device may be further reduced.

Figure 5:
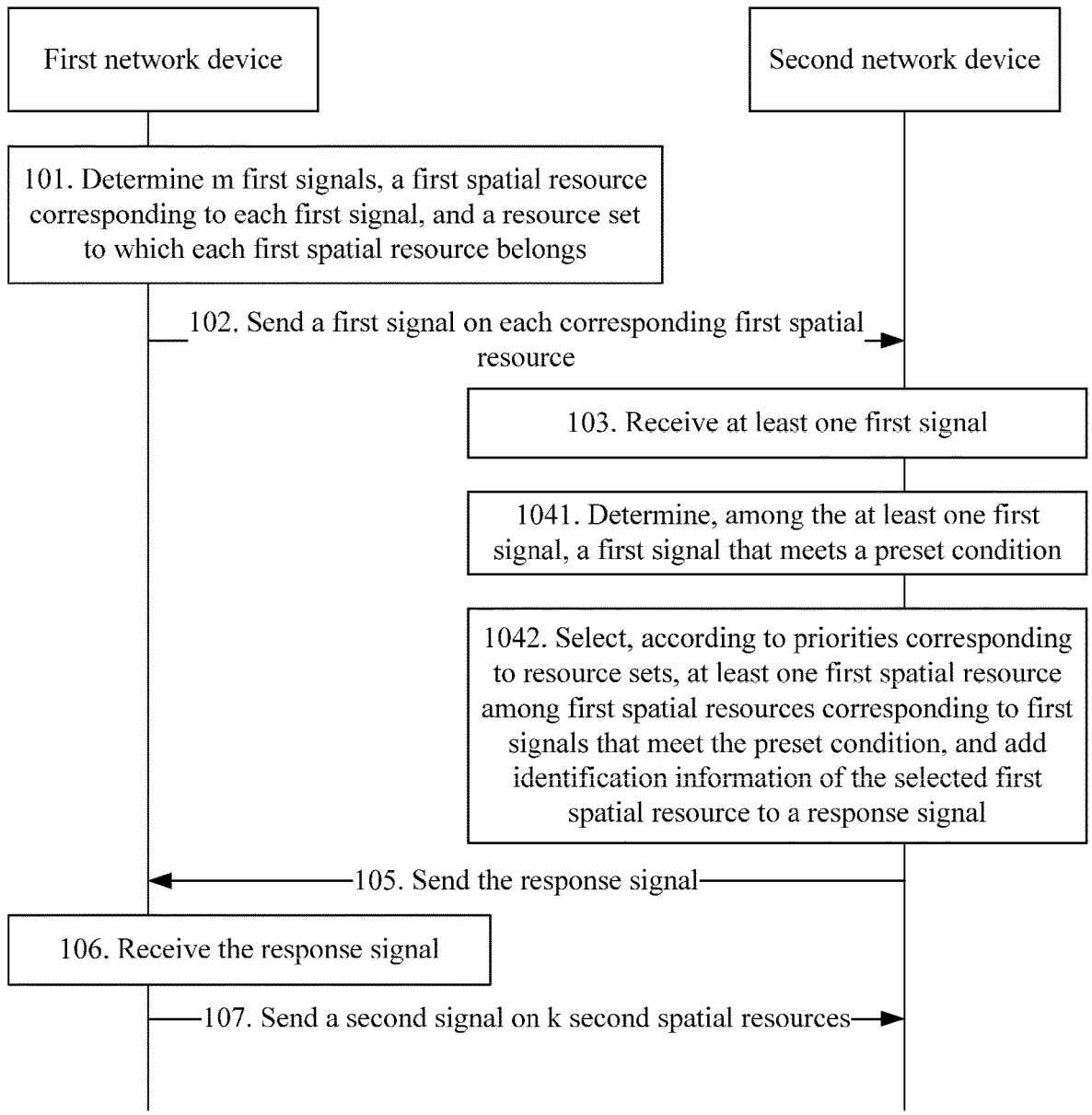
FIG. 5 is a flowchart of another wireless communication method according to an embodiment of the present invention.
Figure 6:
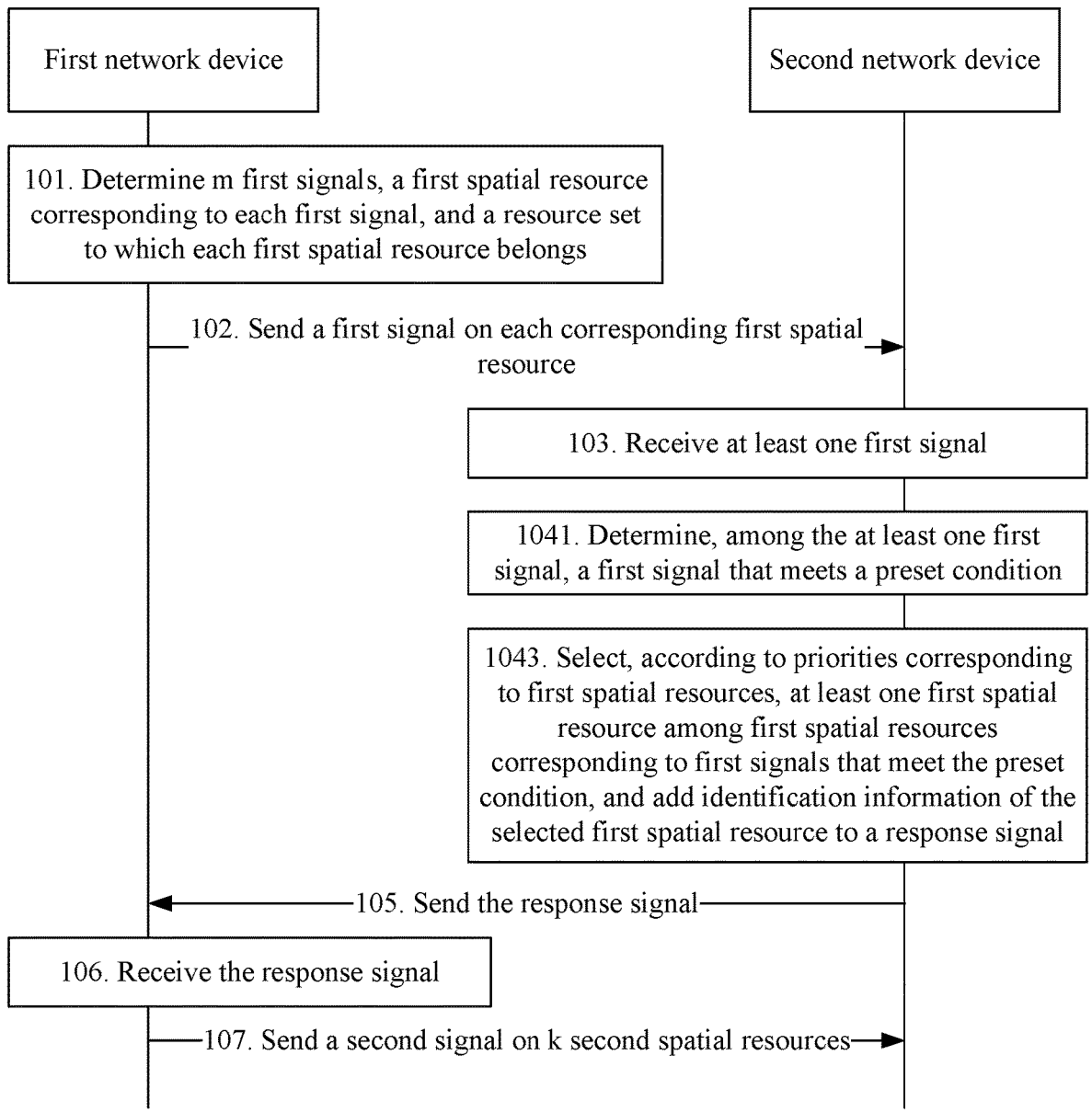
FIG. 6 is a flowchart of another wireless communication method according to an embodiment of the present invention.
Figure 7:
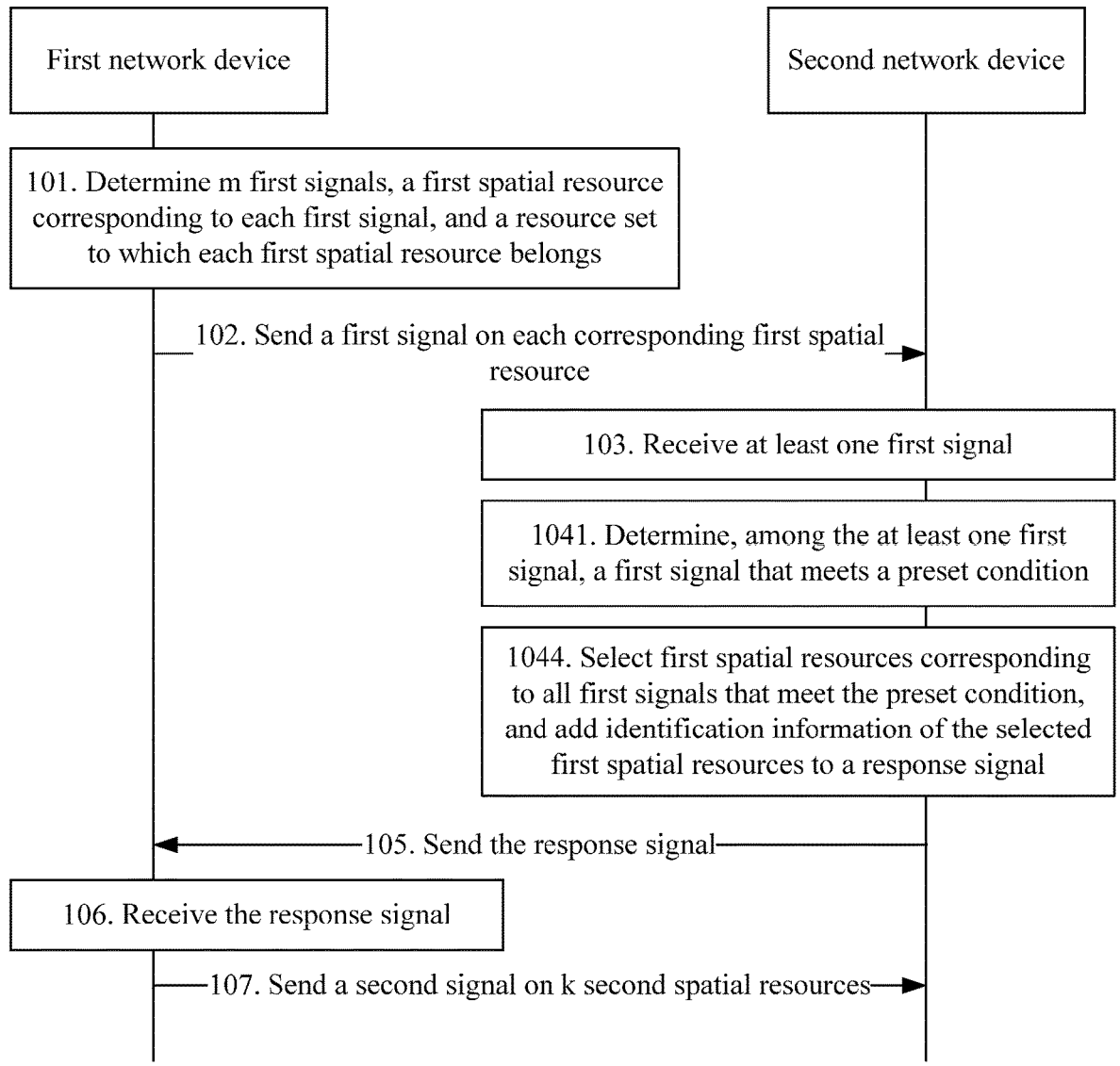
FIG. 7 is a flowchart of another wireless communication method according to an embodiment of the present invention.

Referring to FIG. 5, FIG. 6, and FIG. 7, the foregoing operation 104 may specifically include a combination of the operations 1041 and 1042, a combination of the operations 1041 and 1043, or a combination of the operations 1041 and 1044.

Operation 1041. The second network device determines, among the at least one first signal, a first signal that meets a preset condition.

Optionally, the determining, by the second network device, a first signal that meets a preset condition may include:

determining, by the second network device, a first signal with signal strength greater than or equal to a corresponding threshold, where the corresponding threshold is a threshold corresponding to a resource set to which a first spatial resource corresponding to the first signal belongs.

Specifically, among the at least one first signal received by the second network device, when signal strength of a first signal is greater than or equal to a threshold corresponding to a resource set to which a first spatial resource corresponding to the first signal belongs, it may indicate that the first signal sent on the first spatial resource is relatively strong, and that the first spatial resource can meet the coverage requirement of the second wireless network. Thresholds corresponding to different resource sets may be set according to a specific case. In this case, for example, first spatial resources corresponding to first signals that meet the preset condition and that are determined by the UE1 may be a beam 2 and a beam 9, and first spatial resources corresponding to first signals that meet the preset condition and that are determined by the UE2 may be a beam 3 and the beam 9.

It should be noted that the foregoing preset condition is merely an example and is not intended to limit the protection scope, and the preset condition may be specifically set according to an actual requirement. For example, the first signal that meets the preset condition may also be a first signal sent on a first spatial resource that is agreed in advance between the first network device and the second network device. When the second network device receives a first signal, if a first spatial resource corresponding to the first signal is a first spatial resource that is agreed in advance between the second network device and the first network device, the first signal is the first signal that meets the preset condition.

After determining first signals that meet the preset condition, the second network device may select at least one first spatial resource among first spatial resources corresponding to the first signals that meet the preset condition. The at least one first spatial resource may include one first spatial resource, a plurality of first spatial resources, or all first spatial resources of the first spatial resources corresponding to the first signals that meet the preset condition. For example, the UE1 may select the beam 2 or the beam 9 in the beam 2 and the beam 9 that are corresponding to the first signals that meet the preset condition, and indicate the selected beam to the base station, or select the beam 2 and the beam 9 and indicate the two beams to the base station; and the UE2 may select the beam 3 or the beam 9 in the beam 3 and the beam 9 that are corresponding to the first signals that meet the preset condition, and indicate the selected beam to the base station, or select the beam 3 and the beam 9 and indicate the two beams to the base station.

Specifically, the second network device may select, by performing operation 1042 or operation 1043, the at least one first spatial resource among the first spatial resources corresponding to the first signals that meet the preset condition.

Operation 1042. The second network device selects, according to priorities corresponding to resource sets, at least one first spatial resource among first spatial resources corresponding to first signals that meet the preset condition, and adds identification information of the selected first spatial resource to the response signal.

In this operation, the second network device may select, according to the priorities corresponding to the resource sets and among the first spatial resources corresponding to the first signals that meet the preset condition, one or more first spatial resources that belong to a resource set that is corresponding to a relatively high priority, and add identification information of the selected one or more first spatial resources to the response signal, to indicate the selected one or more first spatial resources to the first network device.

The priorities corresponding to the resource sets may be set according to an actual case. For example, the priorities of the resource sets may be pre-sorted according to the set identification information. For example, when the set identification information is the set identification character carried in the PBCH-carried information, the $15^{th}$ bit, 0, in the PBCH-carried information is corresponding to the resource set 1, and the $15^{th}$ bit, 1, in the PBCH-carried information is corresponding to the resource set 2, it may be pre-set that a priority of the resource set 2 corresponding to the set identification character 1 is higher than a priority of the resource set 1 corresponding to the set identification character 0. For example, a resource set with a smaller threshold is corresponding to a higher priority.

Figure 8:
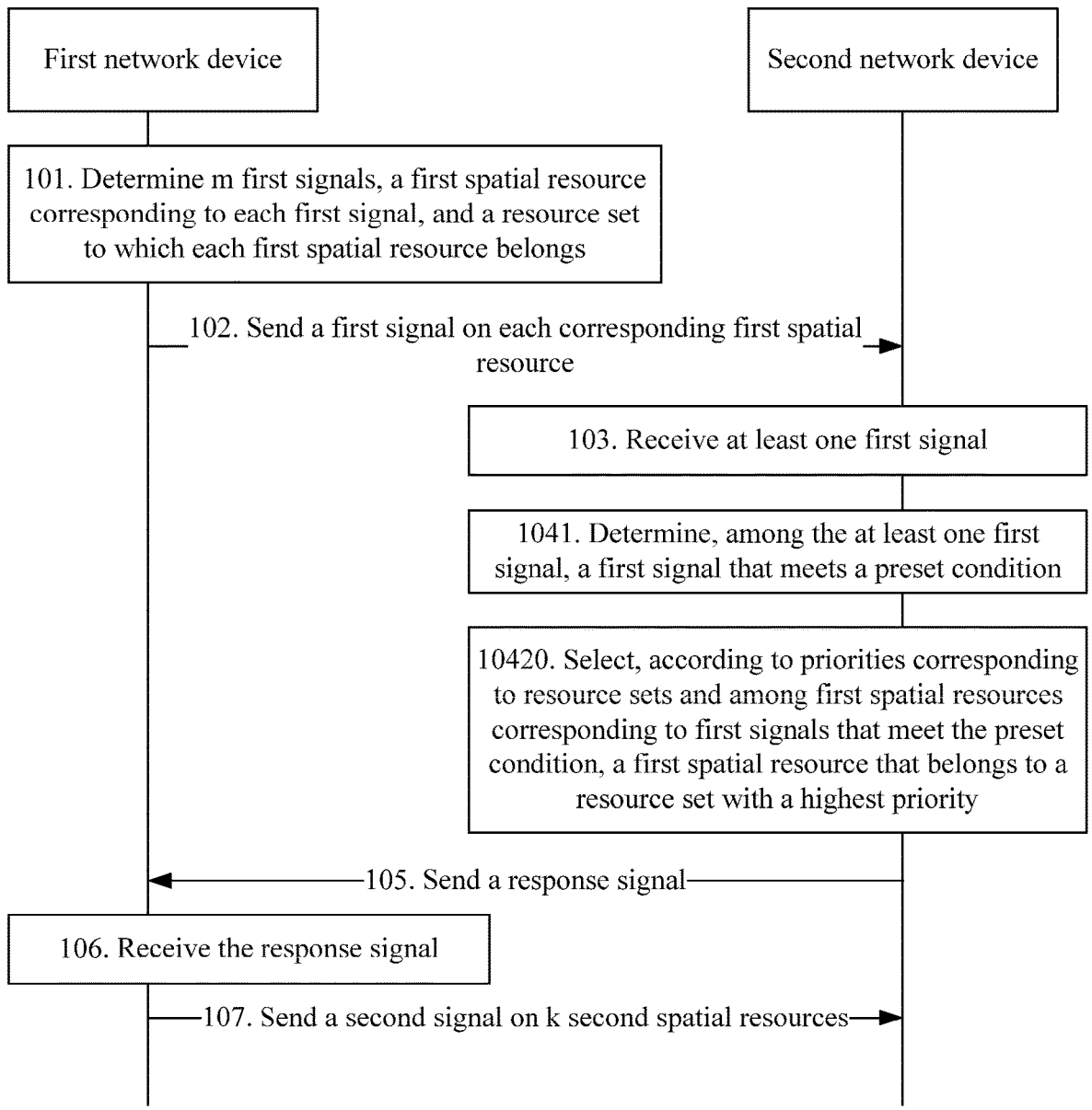
FIG. 8 is a flowchart of another wireless communication method according to an embodiment of the present invention.

Optionally, referring to FIG. 8, the foregoing operation 1042 may be specifically:

Operation 10420. The second network device selects, according to the priorities corresponding to the resource sets and among the first spatial resources corresponding to the first signals that meet the preset condition, a first spatial resource that belongs to a resource set with a highest priority.

If a resource set with a smaller threshold is corresponding to a higher priority, the second network device may select, according to the priorities corresponding to the resource sets and among the first spatial resources corresponding to the first signals that meet the preset condition, a first spatial resource that belongs to a resource set with a smallest threshold.

Optionally, a resource set to which a first spatial resource with a greater coverage width belongs is corresponding to a smaller threshold. Generally, when a gain of an antenna is larger, a coverage width of a beam in a set of beams emitted by the antenna is smaller, a spatial coverage length is greater, and a threshold that is used to detect signal strength and that is corresponding to the set of beams should also be larger, for example, a beam set 1 shown in FIG. 4a; and when a gain of an antenna is smaller, a coverage length of a beam in a set of beams emitted by the antenna is smaller, a coverage width is greater, and a threshold that is used to detect signal strength and that is corresponding to the set of beams should also be smaller, for example, a beam set 2 shown in FIG. 4a.

In the foregoing operation 10420, the second network device may select a first spatial resource with a greatest coverage width among the first signals that meet the preset condition. A resource set to which the first spatial resource with a greatest coverage width belongs is corresponding to a smallest threshold, and therefore, a priority of the resource set is the highest. For example, the UE1 may select, as a selected first spatial resource, the beam 9 with a greater coverage width in the beam 2 and the beam 9, or the UE2 may also select, as a selected first spatial resource, the beam 9 with a greater coverage width in the beam 2 and the beam 9.

It should be noted that a narrow beam coverage scenario is to meet a coverage requirement of a second network device that is farther away from the first network device, the first network device is usually disposed in a position where second wireless networks are relatively centralized, a proportion of second wireless networks that are far away from the first network device (for example, a cell edge) is relatively small, and therefore generally, compared with a narrow beam with a relatively small coverage width but a relatively great coverage length, a wide beam with a relatively great coverage width but a relatively smallcoverage length is more likely to meet coverage requirements of a relatively large quantity of second network devices.

A resource set to which a first spatial resource with a greater coverage width belongs is corresponding to a smaller threshold. Therefore, when a resource set with a smaller threshold is corresponding to a higher priority, and when the second network device selects, among the first spatial resources corresponding to the first signals that meet the preset condition, a first spatial resource that is corresponding to a resource set with a highest priority, the second network device may select, among the first spatial resources corresponding to the first signals that meet the preset condition, a first spatial resource set with a greatest coverage width. In addition, when second network devices are closer to the first network device, a first spatial resource with a relatively great coverage width may simultaneously meet coverage requirements of a plurality of UEs. The coverage requirements may be understood as that signal strength of a first signal that is sent on a first spatial resource and that is received by UE is greater than or equal to a threshold corresponding to a resource set to which the first spatial resource belongs. Therefore, the response signal is used to indicate a first spatial resource with a relatively great coverage width to the first wireless device, so that the first network device can determine, according to first spatial resources with a relatively great coverage width indicated by different second network devices, a relatively small quantity of second spatial resources that can meet the preset coverage requirement, thereby reducing a quantity of second spatial resources that serve the second network devices, and reducing the system resource overheads.

Operation 1043. The second network device selects, according to priorities corresponding to first spatial resources, at least one first spatial resource among first spatial resources corresponding to first signals that meet the preset condition, and adds identification information of the selected first spatial resource to the response signal.

In this operation, the priorities corresponding to the first spatial resources may be set according to an actual case. For example, priority sorting may be performed for the resource sets according to the resource identification information. For example, information about preset priorities corresponding to first spatial resources may include that a priority of the beam 9 is higher than a priority of the beam 2, and the priority of the beam 9 is higher than a priority of the beam 3. when determining that the first first signals that meet the preset condition are the beam 2 and the beam 9, the UE1 may use the beam 9 with a higher priority as the selected first spatial resource, and indicate the beam 9 to the base station. After determining that the first spatial resources corresponding to the first signals that meet the preset condition are the beam 3 and the beam 9, the UE2 may use the beam 9 with a higher priority as the selected first spatial resource, and indicate the beam 9 to the base station.

Operation 1044. The second network device selects first spatial resources corresponding to all first signals that meet the preset condition, and adds identification information of the selected first spatial resources to the response signal.

After determining the first signal that meets the preset condition in operation 1041, the second network device may select the first spatial resources corresponding to all the first signals that meet the preset condition, and add the identification information of the selected first spatial resources to the response signal, to indicate the selected first spatial resources to the first network device.

For example, when the UE1 determines that the first spatial resources corresponding to the first signals that meet the preset condition are the beam 2 and the beam 9, the UE1 selects to indicate both the beam 2 and the beam 9 to the base station by using the response signal. When the UE2 determines that the first spatial resources corresponding to the first signals that meet the preset condition are the beam 3 and the beam 9, the UE2 selects to indicate both the beam 3 and the beam 9 to the base station by using the response signal.

Figure 9:
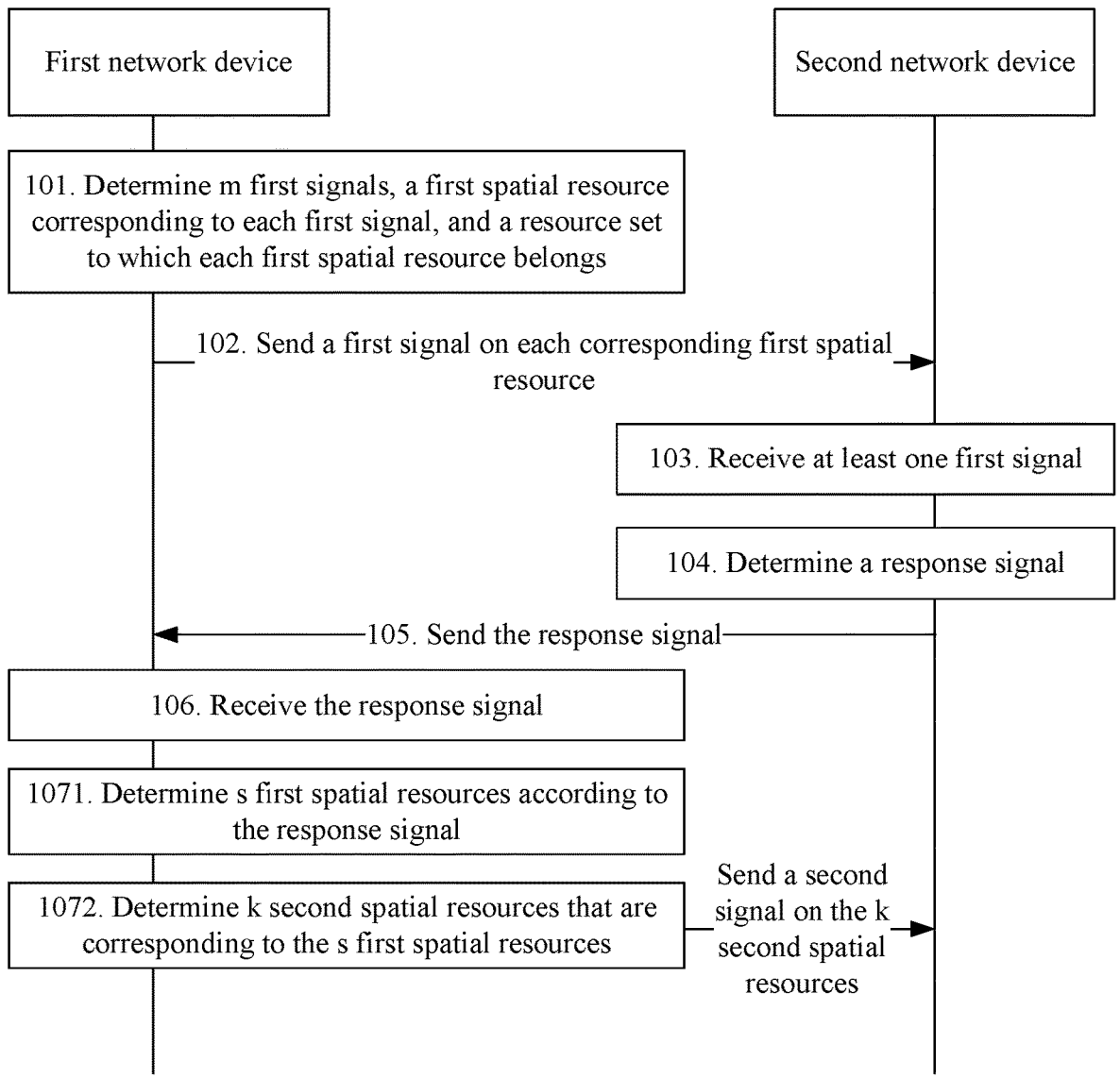
FIG. 9 is a flowchart of another wireless communication method according to an embodiment of the present invention.

Referring to FIG. 9, in the foregoing operation 107, the sending, by the first network device, a second signal to the second network device on k second spatial resources according to the response signal may include:

Operation 1071. The first network device determines s first spatial resources according to the response signal, where s is a positive integer.

Operation 1072. The first network device determines the k second spatial resources that are corresponding to the s first spatial resources, and sends the second signal to the second network device on the k second spatial resources.

Each of the s first spatial resources in operation 1072 may have its corresponding second spatial resource. Correspondences between the first spatial resources and the second spatial resources herein may mean that coverage areas are roughly the same. For example, main lobes of beams have consistent coverage, or coverage areas have a high correlation. A beam width of a first spatial resource and a beam width of a corresponding second spatial resource may be the same or may be different. A beam direction of a first spatial resource and a beam direction of a corresponding second spatial resource may be the same or may be different. First spatial resources and second spatial resources may use same space division granularity or different space division granularity (small or large). For example, there are eight first spatial resources, and the eight first spatial resources are second spatial resources; or there are eight first spatial resources and four second spatial resources, and every two first spatial resources are corresponding to one second spatial resource. A specific correspondence between a first spatial resource and a second spatial resource may be set according to an actual requirement, and may be a one-to-many correspondence, a many-to-one correspondence, or a many-to-many correspondence. This is not limited herein. For example, the corresponding second spatial resource and the first spatial resource have a same beam width and direction; or, the corresponding second spatial resource and the first spatial resource have a same beam width, but there is a phase deviation within a certain threshold between the beam direction of the second spatial resource and the beam direction of the first spatial resource, where the threshold may be defined according to an actual requirement, for example, 10 degrees or 20 degrees; or the corresponding second spatial resource and the first spatial resource have a same beam direction or there is a phase deviation within a certain threshold, and the beam width of the second spatial resource is greater or less than the beam width of the first spatial resource. One second spatial resource may be corresponding to more than one first spatial resource, or one first spatial resource is corresponding to more than one second spatial resource. Because the foregoing correspondences exist between the s first spatial resources and the k second spatial resources, k and s may be equal, or may be different.

It should be noted that when the first spatial resources used by the first network device for sending the first signals belong to different resource sets, the first spatial resources indicated in the response signal sent by the second network device may also belong to different resource sets. Because spatial coverage areas of first spatial resources in different resource sets are not the same, first spatial resources with different coverage areas can meet coverage requirements of different quantities of second network devices. Therefore, the first network device may determine, among first spatial resources in a plurality of resource sets by using a combination of the first spatial resources with different spatial coverage areas, the s first spatial resources that can meet the preset coverage requirement, where s is as small as possible; determine, according to the s first spatial resources, the k second spatial resources that are corresponding to the s first spatial resources, where s and k are relatively small values; and send the second signal on the k second spatial resources, thereby reducing a quantity of second spatial resources that serve the second network devices, and reducing the system resource overheads.

Figure 10:
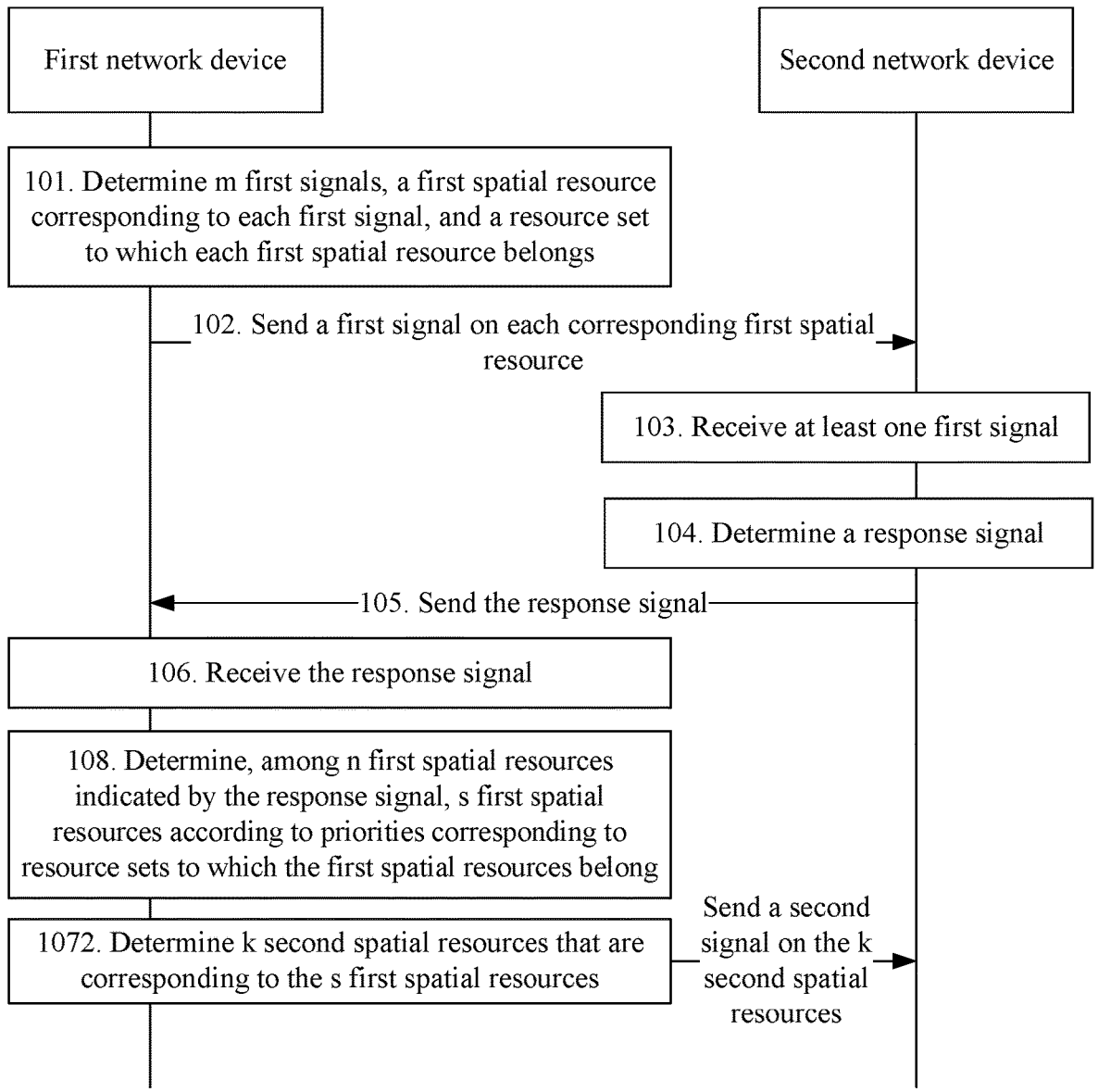
FIG. 10 is a flowchart of another wireless communication method according to an embodiment of the present invention.

Optionally, referring to FIG. 10, the foregoing operation 1071 may be performed as follows:

Operation 108. The first network device determines, among the n first spatial resources indicated by the response signal, the s first spatial resources according to priorities corresponding to resource sets to which the first spatial resources belong.

The first network device receives a response signal sent by each second network device. The response signal indicates n first spatial resources selected by the second network device. The first network device may determine the s first spatial resources according to the priorities corresponding to the resource sets. For a description of the priorities corresponding to the resource sets, refer to the foregoing operation 1042. Optionally, a resource set to which a first spatial resource with a greater coverage width belongs is corresponding to a higher priority.

Figure 11:
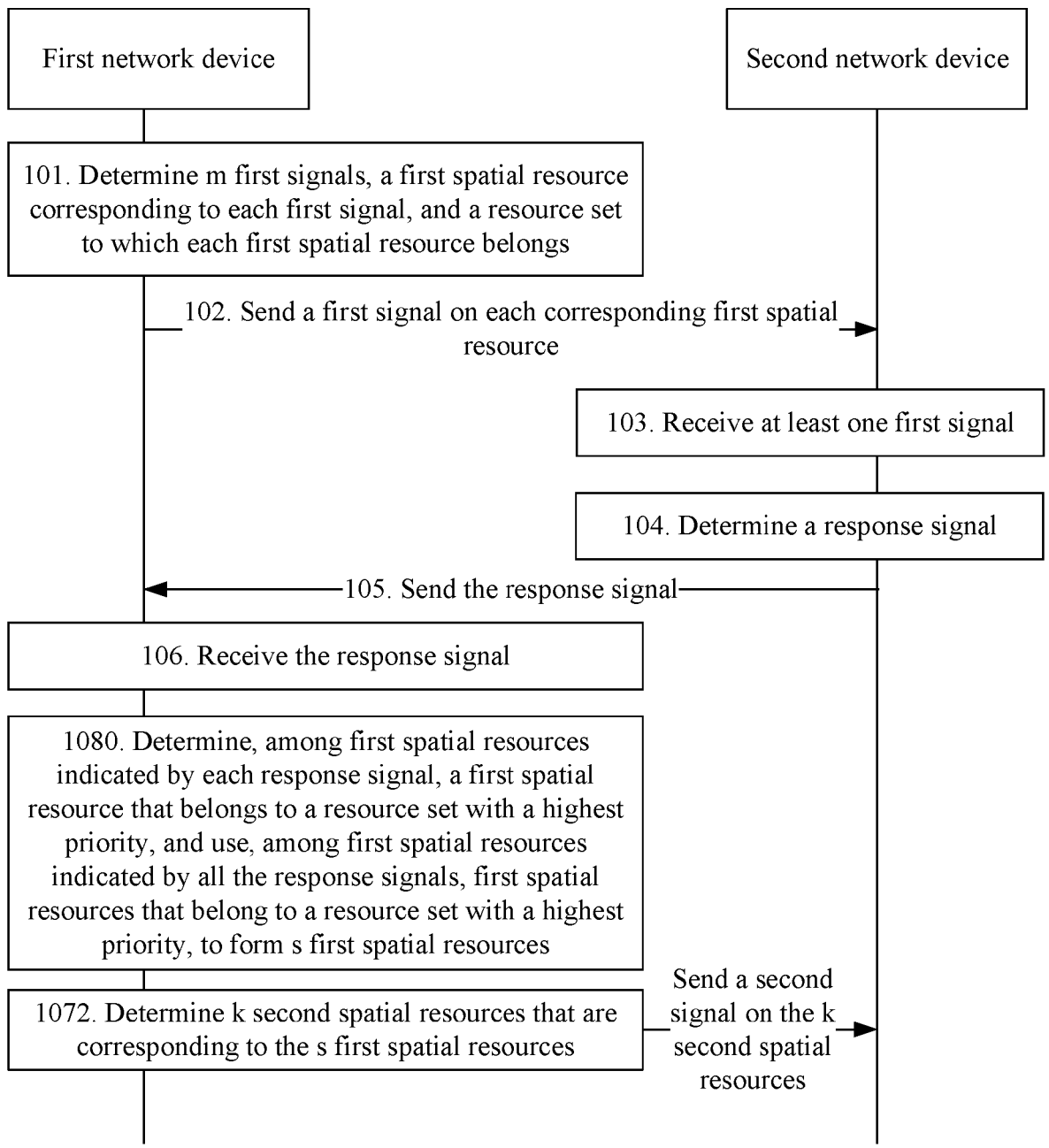
FIG. 11 is a flowchart of another wireless communication method according to an embodiment of the present invention.

Referring to FIG. 11, operation 108 may be performed as follows:

Operation 1080. The first network device determines, among first spatial resources indicated by each response signal, a first spatial resource that belongs to a resource set with a highest priority, and uses, among first spatial resources indicated by all the response signals, first spatial resources that belong to a resource set with a highest priority, to form the s first spatial resources.

The s first spatial resources are the first spatial resources that belong to a resource set with a highest priority in the first spatial resources indicated by all the response signals. Therefore, the s first spatial resources may meet coverage requirements of all second network devices that send the response signals. Because a first spatial resource with a relatively great coverage width may meet coverage requirements of more second network devices, the resource set to which the first spatial resource with a greater coverage width belongs has a higher priority, so that less first spatial resources are determined by the first network device, that is, the first spatial resource quantity s is smaller. In addition, second spatial resources corresponding to all first spatial resources have a roughly same coverage area, and therefore when the quantity s is relatively small, the second spatial resource quantity k may also be relatively small, thereby reducing the quantity of the second spatial resources that serve the second network devices, and reducing the system resource overheads.

For example, a scenario shown in FIG. 4*a* is used as an example. If first spatial resources indicated by the response signal sent by the UE1 include the beam 2 and the beam 9, and first spatial resources indicated by the response signal sent by the UE2 include the beam 3 and the beam 9, the base station determines, among the first spatial resources indicated by each response signal, a first spatial resource that belongs to a resource set with a highest priority.

Figure 12:
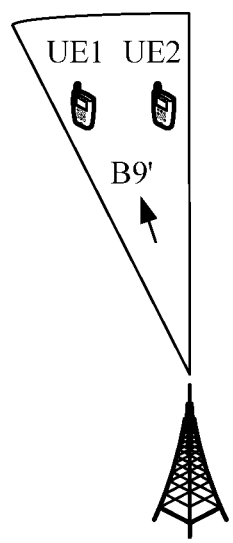
FIG. 12 is a schematic diagram of another type of beam coverage according to an embodiment of the present invention.

If a resource set to which a first spatial resource with a greater coverage width belongs is corresponding to a higher priority, the base station may determine, among the first spatial resources indicated by the response signal sent by the UE1, the beam 9 with a greatest coverage width as a first spatial resource that belongs to a resource set with a highest priority, and the base station may determine, among the first spatial resources indicated by the response signal sent by the UE2, the beam 9 with a greatest coverage width as a first spatial resource that belongs to a resource set with a highest priority. Therefore, the formed s first spatial resources are the beam 9, and s is 1. The base station may determine, according to the beam 9 (the s first spatial resources), that a second spatial resource corresponding to the beam 9 is a beam 9' that has a roughly same coverage area as the beam 9. For details, refer to a schematic beam coverage diagram shown in FIG. 12. The base station sends the second signal by using one beam 9', to simultaneously serve the UE1 and the UE2. Compared with that the base station sends the second signal by using a beam 2' that has a roughly same coverage area as the beam 2 and by using a beam 3' that has a roughly same coverage area as the beam 3, or compared with that the base station sends wireless signals (including the first signal and the second signal in this embodiment of the present invention) by using the beam 0 to the beam 7 shown in FIG. 2, sending the second signal by using the beam 9' may reduce a quantity of beams that serve the UEs, thereby reducing the system resource overheads.

For example, the scenario shown in FIG. 4*a* is still used as an example. If first spatial resources indicated by the response signal sent by the UE1 include only the beam 9 with a relatively wide coverage area, and first spatial resources indicated by the response signal sent by the UE2 include only the beam 9 with a relatively wide coverage area, first spatial resources indicated by all the response signals include only the beam 9 with a relatively wide coverage area, and the s first spatial resources determined by the base station according to all the response signals need to be the beam 9. In this case, the base station may determine, according to the beam 9 (the s first spatial resources), that a second spatial resource corresponding to the beam 9 is a beam 9' that has a roughly same coverage area as the beam 9.

For another example, the scenario shown in FIG. 4*a* is still used as an example. If first spatial resources indicated by the response signal sent by the UE1 include the beam 2 and the beam 9, the base station may determine, among the first spatial resources indicated by the response signal sent by the UE1, the beam 9 with a greatest coverage width as a first spatial resource that belongs to a resource set with a highest priority, and the base station may determine, among the first spatial resources indicated by the response signal sent by the UE2, the beam 9 with a greatest coverage width as a first spatial resource that belongs to a resource set with a highest priority. Therefore, the formed s first spatial resources are the beam 9. Accordingly, the base station may determine, according to the beam 9 (the s first spatial resources), that a second spatial resource corresponding to the beam 9 is a beam 9' that has a roughly same coverage area as the beam 9.

Figure 13:
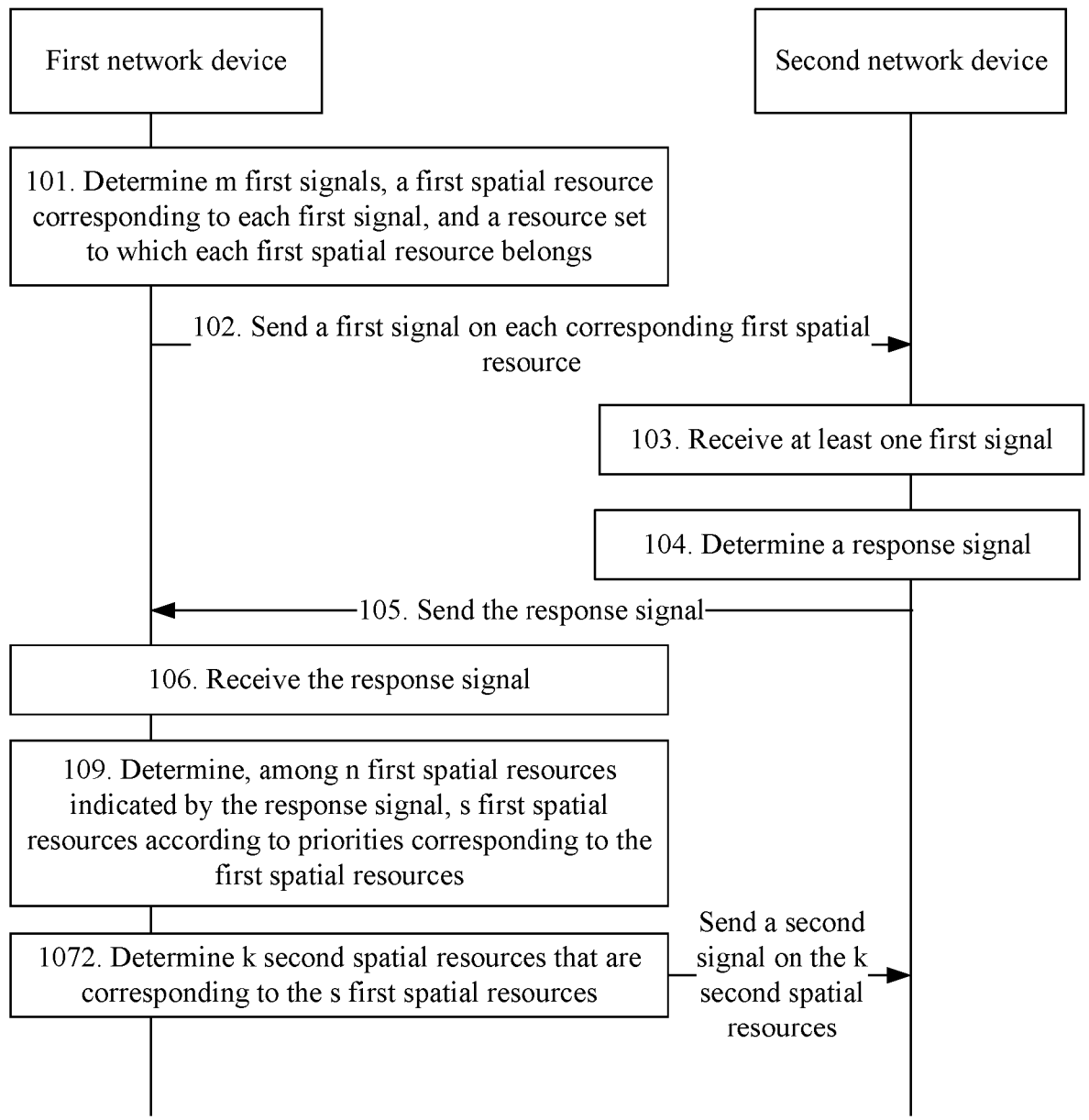
FIG. 13 is a flowchart of another wireless communication method according to an embodiment of the present invention.

Optionally, referring to FIG. 13, the foregoing operation 1071 may be performed as follows:

Operation 109. The first network device determines, among the n first spatial resources indicated by the response signal, the s first spatial resources according to priorities corresponding to the first spatial resources.

The first network device receives a response signal sent by each second network device. The response signal indicates n first spatial resources selected by the second network device. The first network device may determine the s first spatial resources according to the priorities corresponding to the first spatial resources. For a description of the priorities corresponding to the first spatial resources, refer to the foregoing operation 1043. In addition, if there is a large quantity of second network devices that indicate a first spatial resource by using a response signal, the first spatial resource has a high priority.

Figure 14:
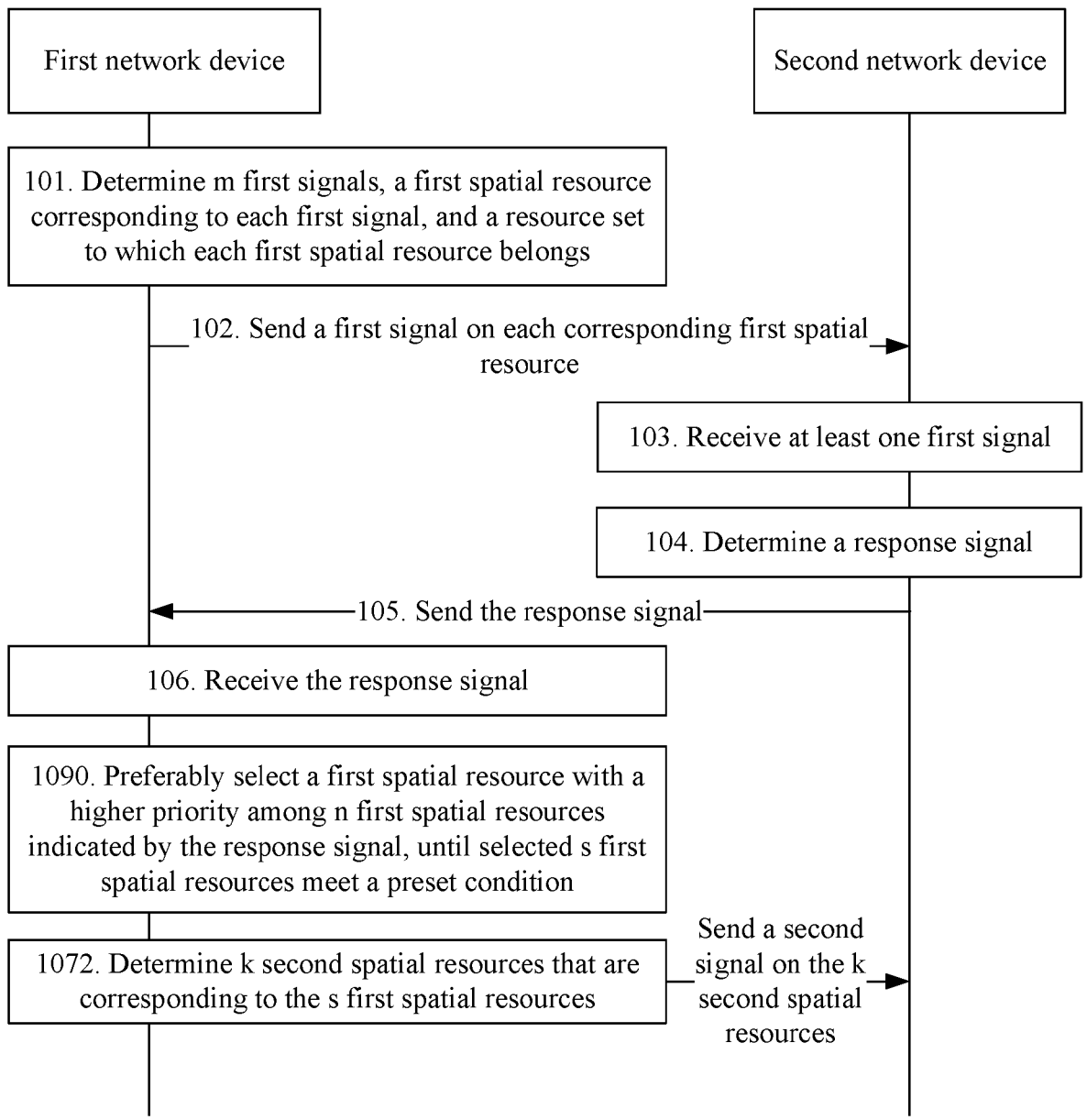
FIG. 14 is a flowchart of another wireless communication method according to an embodiment of the present invention.

Referring to FIG. 14, operation 109 may be performed as follows:

Operation 1090. The first network device preferably selects a first spatial resource with a higher priority among the n first spatial resources indicated by the response signal, until the selected s first spatial resources meet the preset condition.

The preset condition herein may be set according to a requirement, and the preset condition may be the preset coverage requirement. Optionally, the preset condition is that coverage requirements of all second network devices are met, or the preset condition is that coverage requirements of 95% of second network devices are met, or the like. All the second network devices herein are all second network devices in the cell 1 covered by first spatial resources.

A larger quantity of corresponding response signals that indicate a first spatial resource indicate that the indicated first spatial resource can meet coverage requirements of more second network devices. Therefore, a relatively small quantity of first spatial resources may meet coverage requirements of all or some of second network devices. That is, the quantity s may be relatively small. In this way, the second spatial resource quantity k corresponding to the first spatial resource quantity s may also be relatively small, thereby reducing a quantity of second spatial resources that serve the second network devices, and reducing the system resource overheads.

For example, the scenario shown in FIG. 4*a* is used as an example. If first spatial resources indicated by the response signal sent by the UE1 include the beam 2 and the beam 9, and first spatial resources indicated by the response signal sent by the UE2 include the beam 3 and the beam 9, a quantity of UEs that indicate the beam 2 by using a response signal is 1, a quantity of UEs that indicate the beam 3 by using a response signal is 1, and a quantity of UEs that indicate the beam 9 by using a response signal is 2. Therefore, the beam 9 is corresponding to a highest priority. In addition, because the beam 9 can meet not only a coverage requirement of the UE1 but also a coverage requirement of the UE2, the beam 9 is the determined s first spatial resources. In this case, the base station may determine that the beam 9' that has a roughly same coverage area as the beam 9 and that is corresponding to the beam 9 (the s first spatial resources) is the k second spatial resources, and therefore send the second signal on the beam 9', to simultaneously serve the UE1 and the UE2.

Figure 15:
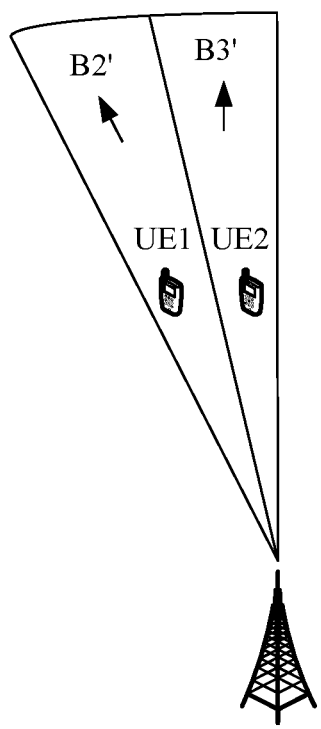
FIG. 15 is a schematic diagram of another type of beam coverage according to an embodiment of the present invention.

It may be learned from the foregoing process that if the m first spatial resources include only the beam 0 to the beam 7 in the resource set 1 shown in FIG. 2, a first spatial resource corresponding to a second spatial resource may be determined among the beam 0 to the beam 7. In this case, a second signal may be sent to the UE1 by using a second spatial resource beam 2' that is corresponding to the first spatial resource beam 2, and a second signal may be sent to the UE2 by using a second spatial resource beam 3' that is corresponding to the first spatial resource beam 3. For details, refer to a schematic beam coverage diagram shown in FIG. 15.

If the m first spatial resources include a plurality of resource sets, for example, the resource set 1 and the resource set 2 shown in FIG. 4*a*, a first spatial resource corresponding to a second spatial resource may be determined among the beam 0 to the beam 11. In this case, a second signal may be simultaneously sent to the UE1 and the UE2 by using a second spatial resource beam 9' that is corresponding to the first spatial resource beam 9, thereby reducing a quantity of second spatial resources that serve the UEs, and reducing the system resource overheads.

In addition, for ease of understanding of the foregoing wireless communication method provided in this embodiment of the present invention, the following briefly describes a specific application scenario of the foregoing wireless communication method by using an example.

For example, in an access scenario, a first network device may send, in a first signal, a synchronization signal with a relatively small amount of information by using the foregoing wireless communication method, so that a second network device that receives the first signal may be synchronized with the first network device. The first network device determines, according to the foregoing wireless communication method, a relatively small quantity of second spatial resources that can meet a preset coverage requirement, and sends a second signal on the second spatial resources. The second signal includes another signal that contains a relatively large amount of information and that is required for access. Compared with the prior art in which each signal required for access is sent by using all first spatial resources, the foregoing wireless communication method may reduce system resource overheads when the second network device accesses a wireless network.

For example, when configuring a CSI-RS, the first network device may determine, by using the foregoing wireless communication method, a relatively small quantity of second spatial resources that can meet the preset coverage requirement, and configure a CSI-RS on each second spatial resource. However, in the prior art, a CSI-RS may be configured only on each first spatial resource. Therefore, compared with the prior art, configuring the CSI-RS by using the foregoing wireless communication method may reduce the system resource overheads.

The foregoing embodiment of the present invention provides the wireless communication method. The first network device sends the m first signals by using the first spatial resources in the different resource sets, where each first signal includes corresponding identification information, and the corresponding identification information is used to indicate a first spatial resource corresponding to a first signal and is further used to indicate a resource set to which a first spatial resource belongs. The second network device selects at least one first spatial resource according to at least one received first signal, a first spatial resource corresponding to a first signal, and a resource set to which each first spatial resource belongs, and indicates the selected first spatial resource to the first network device by using the response signal. The first network device learns of, according to the response signal, the existing second network device, and the correspondence between the second wireless network and the first spatial resource, and therefore determines the k second spatial resources that can meet the preset coverage requirement, and sends the second signal on the k second spatial resources, where k is a relatively small value, thereby serving the second network device by using the k second spatial resources. Therefore, the second signal can be sent more efficiently, thereby saving second spatial resources, and saving system resource overheads required for sending the second signal on an invalid second spatial resource.

When the first spatial resources used by the first network device for sending the first signals belong to different resource sets, first spatial resources indicated in the response signal sent by the second network device may also belong to different resource sets. Because spatial coverage areas of first spatial resources in different resource sets are not the same, first spatial resources with different coverage areas can meet coverage requirements of different quantities of second network devices. Therefore, the first network device may determine, according to correspondences between the second network devices and the first spatial resources indicated in the sent response signals and according to coverage areas of the first spatial resources that belong to different resource sets, a relatively small quantity of second spatial resources that can meet the preset coverage requirement, and send the second signal by using the determined second spatial resources, thereby reducing a quantity of second spatial resources that serve the second network devices, and reducing system resource overheads.

In addition, when a quantity of spatial resources serving the second network devices decreases, time resources, frequency resources, and code resources that serve the second network devices decrease accordingly, thereby further reducing the system resource overheads.

Figure 16:
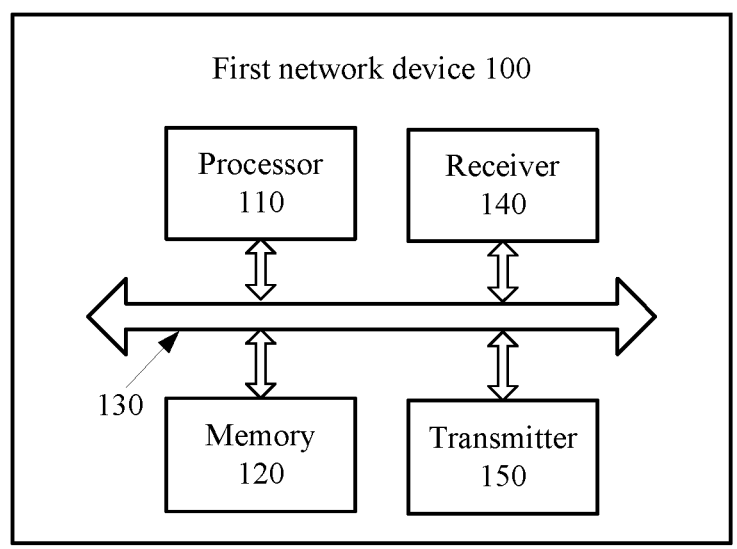
FIG. 16 is a schematic structural diagram of a network device according to an embodiment of the present invention.

According to the method provided in the foregoing embodiment of the present invention, an embodiment of the present invention further provides a network device 100, as shown in FIG. 16. The network device 100 is corresponding to the first network device in the foregoing method embodiment, and may include a processor 110, a memory 120, a system bus 130, a receiver 140, and a transmitter 150. The memory 120 is configured to store an instruction. The processor 110 is configured to execute the instruction stored in the memory 120, to control the receiver 140 to receive a signal and to control the transmitter 150 to transmit a signal, so as to perform the steps in the foregoing wireless communication method. The receiver 140 and the transmitter 150 may be a same physical entity or different physical entities. When being the same physical entity, the receiver 140 and the transmitter 150 may be collectively referred to as a transceiver.

In an implementation, functions of the receiver 140 and the transmitter 150 may be implemented by using a transceiver circuit or a dedicated transceiver chip. The processor 110 may be implemented by using a dedicated processing chip, a processing circuit, a processor, or a general-purpose chip.

The operations in the foregoing wireless communication method may at least include:

determining m first signals, a first spatial resource corresponding to each first signal, and a resource set to which each first spatial resource belongs, where m is a positive integer;

sending a first signal on each corresponding first spatial resource, where each first signal includes corresponding identification information, the corresponding identification information is used to indicate a first spatial resource corresponding to a first signal, and the corresponding identification information is further used to indicate a resource set to which a first spatial resource belongs;

receiving a response signal sent by a second network device, where the response signal is used to indicate n first spatial resources, and n is a positive integer; and sending a second signal to the second network device on k second spatial resources according to the response signal, where k is a positive integer.

The corresponding identification information includes set identification information that is used to indicate the resource set to which the first spatial resource belongs, and the set identification information is:

a set identification character included in the first signal;

a type of a sequence included in the first signal;

a type of a scrambling code added for information in the first signal;

a type of a mask added for information in the first signal; or a calculation manner of a cyclic redundancy check code CRC of information in the first signal.

Optionally, the sending a second signal to the second network device on k second spatial resources according to the response signal includes:

determining s first spatial resources according to the response signal, where s is a positive integer; and determining the k second spatial resources that are corresponding to the s first spatial resources, and sending the second signal to the second network device on the k second spatial resources.

Optionally, the determining s first spatial resources according to the response signal includes:

determining, among the n first spatial resources indicated by the response signal, the s first spatial resources according to priorities corresponding to resource sets to which the first spatial resources belong.

Specifically, the determining, among the n first spatial resources indicated by the response signal, the s first spatial resources according to priorities corresponding to resource sets to which the first spatial resources belong includes:

determining, among first spatial resources indicated by each response signal, a first spatial resource that belongs to a resource set with a highest priority; and using, among the first spatial resources indicated by the response signal, first spatial resources that belong to a resource set with a highest priority, to form the s first spatial resources.

A resource set to which a first spatial resource with a greater coverage width belongs is corresponding to a higher priority.

Optionally, the determining s first spatial resources according to the response signal includes:

determining, among the n first spatial resources indicated by the response signal, the s first spatial resources according to priorities corresponding to the first spatial resources.

Specifically, the determining, among the n first spatial resources indicated by the response signal, the s first spatial resources according to priorities corresponding to the first spatial resources includes:

preferably selecting a first spatial resource with a higher priority among the n first spatial resources indicated by the response signal, until the selected s first spatial resources meet a preset condition.

The preset condition is that coverage requirements of all second network devices are met.

In addition, if there is a large quantity of second network devices that indicate the first spatial resource by using the response signal, the first spatial resource has a high priority.

For a concept, an explanation, a detailed description, and other steps that are related to the technical solutions provided in this embodiment of the present invention with respect to the first network device, refer to descriptions of the content in the foregoing method or another embodiment. Details are not described herein.

Figure 17:
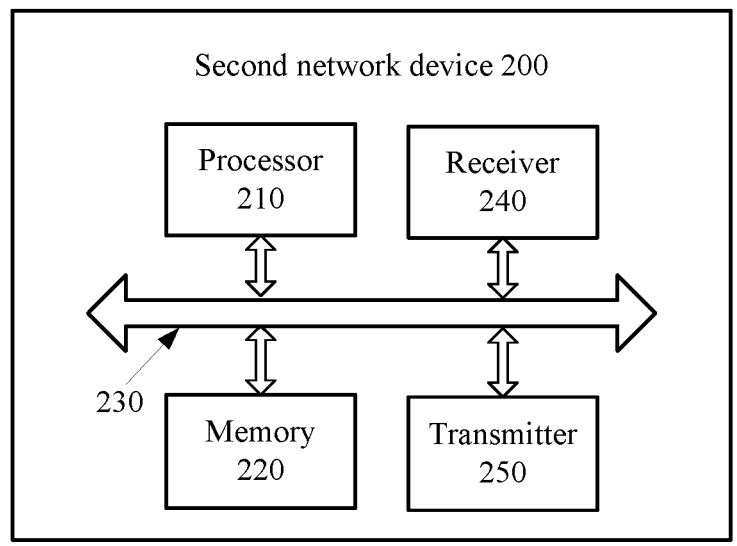
FIG. 17 is a schematic structural diagram of another network device according to an embodiment of the present invention.

According to a method provided in the foregoing embodiment of the present invention, referring to FIG. 17, an embodiment of the present invention further provides a network device 200. The network device 200 is corresponding to the second network device in the foregoing method embodiment, and may include a processor 210, a memory 220, a system bus 230, a receiver 240, and a transmitter 250. The processor 210, the memory 220, the receiver 240, and the transmitter 250 are connected by using the system bus 230. The memory 220 is configured to store an instruction. The processor 210 is configured to execute the instruction stored in the memory 220, to control the receiver 240 to receive a signal and to control the transmitter 250 to transmit a signal, so as to perform the steps in the foregoing wireless communication method. The receiver 240 and the transmitter 250 may be a same physical entity or different physical entities. When being the same physical entity, the receiver 240 and the transmitter 250 may be collectively referred to as a transceiver.

In an implementation, functions of the receiver 240 and the transmitter 250 may be implemented by using a transceiver circuit or a dedicated transceiver chip. The processor 210 may be implemented by using a dedicated processing chip, a processing circuit, a processor, or a general-purpose chip.

The operations in the foregoing wireless communication method may at least include:

receiving at least one first signal, where each first signal includes corresponding identification information, the corresponding identification information is used to indicate a first spatial resource corresponding to a first signal, and the corresponding identification information is further used to indicate a resource set to which a first spatial resource belongs;

determining a response signal according to the at least one first signal, the first spatial resource corresponding to the first signal, and a resource set to which each first spatial resource belongs, where the response signal is used to indicate at least one selected first spatial resource; and sending the response signal to a first network device.

Optionally, the determining a response signal according to the at least one first signal, the first spatial resource corresponding to the first signal, and a resource set to which each first spatial resource belongs, where the response signal is used to indicate at least one selected first spatial resource includes:

determining, among the at least one first signal, a first signal that meets a preset condition; and selecting, according to priorities corresponding to resource sets, at least one first spatial resource among first spatial resources corresponding to first signals that meet the preset condition, and adding identification information of the selected first spatial resource to the response signal;

or, selecting, according to priorities corresponding to first spatial resources, at least one first spatial resource among first spatial resources corresponding to first signals that meet the preset condition, and adding identification information of the selected first spatial resource to the response signal.

Optionally, the selecting, according to priorities corresponding to resource sets, at least one first spatial resource among first spatial resources corresponding to first signals that meet the preset condition includes:

selecting, according to the priorities corresponding to the resource sets and among the first spatial resources corresponding to the first signals that meet the preset condition, a first spatial resource that belongs to a resource set with a highest priority.

Optionally, the determining a first signal that meets a preset condition includes:

determining a first signal with signal strength greater than or equal to a corresponding threshold, where the corresponding threshold is a threshold corresponding to a resource set to which a first spatial resource corresponding to the first signal belongs.

A resource set with a smaller threshold is corresponding to a higher priority.

In addition, a resource set to which a first spatial resource with a greater coverage width belongs is corresponding to a smaller threshold.

Optionally, the determining a response signal according to the at least one first signal, the first spatial resource corresponding to the first signal, and a resource set to which each first spatial resource belongs, where the response signal is used to indicate at least one selected first spatial resource includes:

determining, among the at least one first signal, a first signal that meets a preset condition; and selecting first spatial resources corresponding to all first signals that meet the preset condition, and adding identification information of the selected first spatial resources to the response signal.

For a concept, an explanation, a detailed description, and other operations that are related to the technical solutions provided in this embodiment of the present invention with respect to the second network device, refer to descriptions of the content in the foregoing method or another embodiment. Details are not described herein.

It should be understood that, in this embodiment of the present invention, the processor 110 or 210 may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware assembly, or the like. The general-purpose processor may be a microprocessor, or the processor may be any conventional processor or the like.

The memory 120 or 220 may include a read-only memory and a random access memory, and provide instructions and data for the processor. A part of the memory may further include a non-volatile random access memory. For example, the memory may further store device type information.

The system bus 130 or 230 may include not only a data bus but also a power supply bus, a control bus, a status signal bus, and the like. However, for clear description, various buses are denoted by the system bus in the diagram.

In an implementation process, the steps of the foregoing method may be implemented by an integrated logic circuit of hardware in the processor 110 or 210, or by using an instruction in a form of software. The steps of the methods disclosed with reference to the embodiments of the present invention may be directly executed by a hardware processor, or may be executed by a combination of hardware and a software module in a processor. The software module may be located in a storage medium that is mature in the art, such as a random access memory, a flash memory, a read-only memory, a programmable read-only memory or an electrically erasable programmable memory, or a register. The storage medium is located in the memory, and the processor reads information in the memory and completes the steps of the foregoing methods in combination with hardware of the processor. To avoid repetition, details are not described herein.

Figure 18:
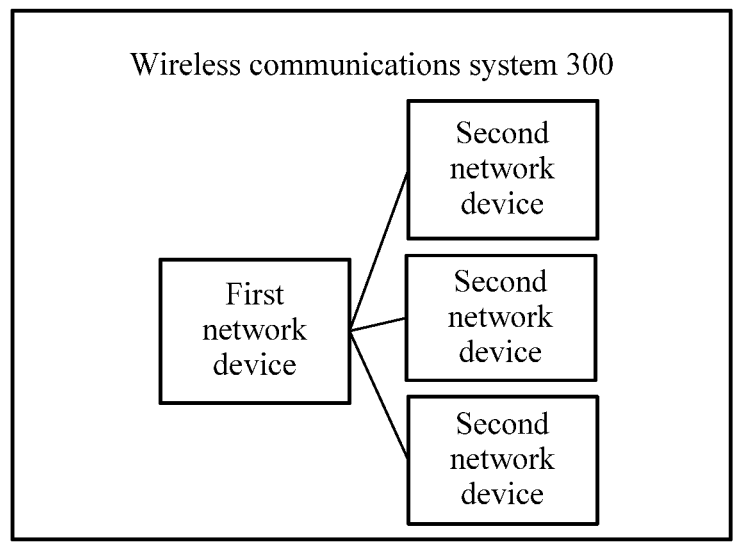
FIG. 18 is a schematic diagram of a basic architecture of a wireless communications system according to an embodiment of the present invention.

According to a method and network devices provided in the foregoing embodiments, referring to FIG. 18, an embodiment of the present invention further provides a wireless communications system 300. The wireless communications system 300 may include the first network device shown in FIG. 16 and the second network device shown in FIG. 17. The first network device and the second network device are configured to execute the steps in the foregoing method embodiment.

It may be clearly understood by persons skilled in the art that, for the purpose of convenient and brief description, for a detailed working process of the foregoing apparatus, reference may be made to a corresponding process in the foregoing method embodiment, and details are not described herein.

In the several embodiments provided in this application, it should be understood that the disclosed device, method, and system may be implemented in other manners. For example, the described apparatus embodiments are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electrical, mechanical, or other forms. The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention. In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a wireless network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

For some specific functions of the apparatus, system, or device, refer to a description in the foregoing method embodiment.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A wireless communication method, comprising:
   determining m first signals, m spatial resources corresponding to the m first signals respectively, and a resource set to which each of the first spatial resources belongs, wherein m is a positive integer;
   sending each of the m first signals on each corresponding first spatial resource to a second network device, wherein each of the m first signals comprises corresponding identification information to indicate a first spatial resource corresponding to the first signal, and wherein the corresponding identification information further indicates a resource set to which the corresponding first spatial resource belongs;
   receiving a response signal from the second network device, wherein the response signal includes information indicating n of the m first spatial resources, and n is a positive integer;
   determining s first spatial resources according to the response signal, wherein s is a positive integer;
   determining k second spatial resources that are corresponding to the s first spatial resources; and
   sending a second signal to the second network device on the k second spatial resources selected from the n first spatial resources according to the response signal, wherein k is a positive integer.

2. The method according to claim 1, wherein the determining s first spatial resources according to the response signal comprises:
   determining, among the n first spatial resources indicated by the response signal, the s first spatial resources according to priorities corresponding to resource sets to which the first spatial resources belong.

3. The method according to claim 2, wherein a resource set to which a first spatial resource with a greater coverage width belongs is corresponding to a higher priority.

4. The method according to claim 2, wherein the determining, among the n first spatial resources indicated by the response signal, the s first spatial resources according to priorities corresponding to resource sets to which the first spatial resources belong comprises:
   determining, among first spatial resources indicated by the response signal, a first spatial resource that belongs to a resource set with a highest priority; and
   determining, among the first spatial resources indicated by the response signal, first spatial resources that belong to a resource set with a highest priority, to form the s first spatial resources.

5. The method according to claim 1, wherein the determining s first spatial resources according to the response signal comprises:
   determining, among the n first spatial resources indicated by the response signal, the s first spatial resources according to priorities corresponding to the first spatial resources.

6. The method according to claim 5, wherein the determining, among the n first spatial resources indicated by the response signal, the s first spatial resources according to priorities corresponding to the first spatial resources comprises:
   selecting a first spatial resource with a higher priority among the n first spatial resources indicated by the response signal, until the selected s first spatial resources meet a preset condition.

7. The method according to claim 6, wherein the second network device is one of a plurality of network devices, wherein the preset condition is that coverage requirements of all of the plurality network devices are met.

8. The method according to claim 5, wherein the second network device is one of a plurality of network devices, wherein if there is a large quantity of the network devices that indicate the first spatial resource by using the response signal, the first spatial resource has a high priority.

9. A wireless communication method, comprising:
   receiving one or more first signals, wherein each of the first signals comprises corresponding identification information to indicate a first spatial resource corresponding to the first signal, and wherein the corresponding identification information is further to indicate a resource set to which the corresponding first spatial resource belongs;
   determining, among the first signals, one or more second signals that meet a preset condition;
   selecting first spatial resources corresponding to the second signals that meet the preset condition, and adding identification information of the selected first spatial resources to a response signal, wherein the response signal is used to indicate at least one selected first spatial resource selected from the first spatial resources associated with the first signals; and
   sending the response signal to a first network device.

10. The method according to claim 9, further comprising determining a response signal according to the first signals, the first spatial resource corresponding to each of the first signals, and a resource set to which each first spatial resource belongs, including:
    determining, among the first signals, one or more second signals that meet a preset condition; and
    selecting, according to priorities corresponding to resource sets, at least one first spatial resource among first spatial resources corresponding to the second signals that meet the preset condition, and adding identification information of the selected first spatial resource to the response signal; or
    selecting, according to priorities corresponding to first spatial resources, at least one first spatial resource among first spatial resources corresponding to the second signals that meet the preset condition, and adding identification information of the selected first spatial resource to the response signal.

11. The method according to claim 10, wherein the selecting, according to priorities corresponding to resource sets, at least one first spatial resource among first spatial resources corresponding to the second signals that meet the preset condition comprises:

selecting, according to the priorities corresponding to the resource sets and among the first spatial resources corresponding to the second signals that meet the preset condition, a first spatial resource that belongs to a resource set with a highest priority.

12. The method according to claim 11, wherein a resource set with a smaller threshold is corresponding to a higher priority.

13. The method according to claim 12, wherein a resource set to which a first spatial resource with a greater coverage width belongs is corresponding to a smaller threshold.

14. The method according to claim 9, wherein the determining one or more second signals that meet a preset condition comprises:

determining a first signal with signal strength greater than or equal to a corresponding threshold, wherein the corresponding threshold is a threshold corresponding to a resource set to which a first spatial resource corresponding to the first signal belongs.

15. A network device, comprising a processor, a memory, and a transceiver, wherein the memory is configured to store an instruction, the processor is configured to execute the instruction stored in the memory, to control the transceiver to perform signal reception and transmission, and when the processor executes the instruction stored in the memory, the network device is configured to perform the method according to claim 1.

16. A network device, comprising a processor, a memory, and a transceiver, wherein the memory is configured to store an instruction, the processor is configured to execute the instruction stored in the memory, to control the transceiver to perform signal reception and transmission, and when the processor executes the instruction stored in the memory, the network device is configured to perform the method according to claim 9.

17. A wireless communications system, comprising a first network device and a second network device, wherein the first network device comprising a processor, a memory, and a transceiver, wherein the memory is configured to store an instruction, the processor is configured to execute the instruction stored in the memory, to control the transceiver to perform signal reception and transmission, and when the processor executes the instruction stored in the memory, the first network device is configured to perform:

determining m first signals, m spatial resources corresponding to each of the m first signals respectively, and a resource set to which each of the first spatial resources belongs, wherein m is a positive integer;

sending each of the m first signals on each corresponding first spatial resource to a second network device, wherein each of the m first signals comprises corresponding identification information to indicate a first spatial resource corresponding to the first signal, and wherein the corresponding identification information is further to indicate a resource set to which the corresponding first spatial resource belongs;

receiving a response signal from the second network device, wherein the response signal includes information indicating n of the m first spatial resources, and n is a positive integer; and determining s first spatial resources according to the response signal, wherein s is a positive integer;

determining the k second spatial resources that are corresponding to the s first spatial resources;

sending a second signal to the second network device on k second spatial resources selected from the n first spatial resources according to the response signal, wherein k is a positive integer;

wherein the second network device comprising a processor, a memory, and a transceiver, wherein the memory is configured to store an instruction, the processor is configured to execute the instruction stored in the memory, to control the transceiver to perform signal reception and transmission, and when the processor executes the instruction stored in the memory, the second network device is configured to perform:

receiving at least one of the m first signals, wherein each received first signal comprises corresponding identification information to indicate a first spatial resource corresponding to the first signal, and wherein the corresponding identification information is further to indicate a resource set to which the corresponding first spatial resource belongs;

determining, among the first signals, one or more second signals that meet a preset condition;

selecting first spatial resources corresponding to the second signals that meet the preset condition, and adding identification information of the selected first spatial resources to the response signal, wherein the response signal is used to indicate at least one selected first spatial resource; and sending the response signal to the first network device.

* * * * *